United States Patent
Cho et al.

(10) Patent No.: US 11,477,075 B2
(45) Date of Patent: Oct. 18, 2022

(54) WIDEBAND CARRIER CONFIRGURATION

(71) Applicant: Apple Inc., Cupertino, CA (US)

(72) Inventors: Joonyoung Cho, Portland, OR (US); Gang Xiong, Portland, OR (US); Ralf Bendlin, Portland, OR (US); Hwan-Joon Kwon, Santa Clara, CA (US); Seunghee Han, San Jose, CA (US); Honglei Miao, Munich (DE); Ingolf Karls, Feldkirchen (DE); Markus Dominik Mueck, Unterhaching BY (DE); Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 651 days.

(21) Appl. No.: 16/339,693

(22) PCT Filed: Oct. 18, 2017

(86) PCT No.: PCT/US2017/057118
§ 371 (c)(1),
(2) Date: Apr. 4, 2019

(87) PCT Pub. No.: WO2018/085045
PCT Pub. Date: May 11, 2018

(65) Prior Publication Data
US 2021/0377108 A1      Dec. 2, 2021

Related U.S. Application Data

(60) Provisional application No. 62/418,123, filed on Nov. 4, 2016.

(51) Int. Cl.
*H04L 41/0803*    (2022.01)
*H04L 41/0896*    (2022.01)
(Continued)

(52) U.S. Cl.
CPC ...... *H04L 41/0803* (2013.01); *H04L 41/0896* (2013.01); *H04W 8/22* (2013.01); *H04W 72/0453* (2013.01)

(58) Field of Classification Search
CPC .. H04L 41/0803; H04L 41/0896; H04W 8/22; H04W 72/0453
See application file for complete search history.

(56) References Cited

U.S. PATENT DOCUMENTS

2015/0124740 A1\*  5/2015  Chen .................... H04L 1/1822
                                                          370/329
2016/0119948 A1\*  4/2016  Damnjanovic ....... H04L 5/0094
                                                          370/280
(Continued)

FOREIGN PATENT DOCUMENTS

WO    2012/175030 A1    12/2012
WO    2013/135952 A1     9/2013

OTHER PUBLICATIONS

International Patent Office—International Search Report and Written Opinion dated Jan. 26, 2018 from International Application No. PCT/US2017057118, 20 pages.
(Continued)

*Primary Examiner* — Charles C Jiang
*Assistant Examiner* — Shawn D Miller
(74) *Attorney, Agent, or Firm* — Fish & Richardson P.C.

(57) ABSTRACT

A base station may generate first configuration information to configure a first user equipment ("UE") to operate using a first bandwidth within a wideband carrier of a cell, generate second configuration information to configure a second UE to operate using a second bandwidth within the wideband carrier of the cell, and cause transmission of the first and second configuration information to the first and second UEs, respectively. The base station may configure
(Continued)

the first and second UEs based upon capabilities received from each UE, respectively.

25 Claims, 11 Drawing Sheets

(51) Int. Cl.
*H04W 8/22* (2009.01)
*H04W 72/04* (2009.01)

(56) References Cited

U.S. PATENT DOCUMENTS

2016/0183293 A1    6/2016  Lei et al.
2016/0353299 A1*  12/2016  Sayeed ................. H04W 24/08
2017/0215186 A1*  7/2017  Chen ................... H04L 27/2602

OTHER PUBLICATIONS

Qualcomm Incorporated, "Views on wideband NR operation," 3GPP TSG RAN WG1 #88, R1-1702650, Agenda item: 8.1.7, Feb. 13-17, 2017, Athens, Greece, 5 pages.

LG Electronics, "Discussion on wideband operation," 3GPP TSG RAN WG1 Meeting #88, R1-1702503, Agenda Item: 8.1.8, Feb. 13-17, 2017, Athens, Greece, 10 pages.

3GPP, "RAN1 Chairman's Notes," 3GPP TSG RAN WG1 Meeting #88, Feb. 13-17, 2017, Athens, Greece, 109 pages.

International Preliminary Report on Patentability in International Appln. No. PCT/US2017/057118, dated May 16, 2019, 14 pages.

* cited by examiner

WIDEBAND CARRIER CONFIRGURATION

RELATED APPLICATION

This application is a national phase entry under 35 U.S.C. § 371 of International Application No. PCT/US2017/057118, filed Oct. 18, 2017, entitled "WIDEBAND CARRIER CONFIGURATION," which claims priority to U.S. Provisional Filing No. 62/418,123, filed on 4 Nov. 2016, and entitled "5G WIDE BANDWIDTH OPERATION," the entire disclosures of which are hereby incorporated by reference.

TECHNICAL FIELD

Embodiments described herein generally relate to wireless communication; in particular, systems and methods for wideband carrier configuration are disclosed.

BACKGROUND

Mobile communication has evolved significantly from early voice systems to today's highly sophisticated integrated communication platform. The next generation wireless communication system, "5G" or new radio ("NR"), will provide access to information and sharing of data anywhere, anytime by various users and applications. 5G is expected to be a unified network/system to meet vastly different and sometime conflicting performance dimensions and services. Such diverse multi-dimensional requirements are driven by different services and applications. In general, NR will evolve to enrich peoples' lives with better, simpler and seamless wireless connectivity solutions. 5G will enable everything connected by wireless to deliver fast, rich contents and services.

5G also will support higher data speeds and more efficient allocation and use of available radio spectrum.

DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
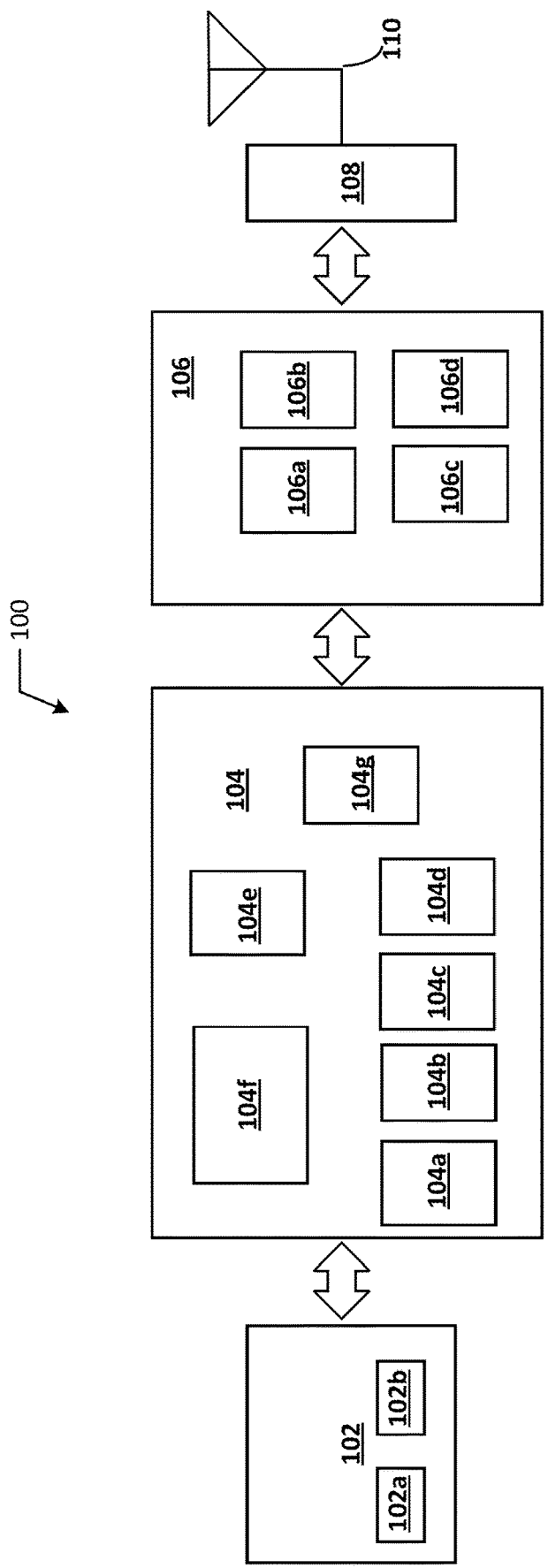
FIG. 1 depicts an architecture of a system of a network in accordance with some embodiments.

Embodiments described herein may be implemented into a system using any suitably configured hardware and/or software. FIG. 1 illustrates, for one embodiment, example components of an electronic device 100. In embodiments, the electronic device 100 may be implemented, be incorporated into, or otherwise be a part of a user equipment (UE), an evolved NodeB (eNB), or a next-generation NodeB (gNB). In some embodiments, the electronic device 100 may include application circuitry 102, baseband circuitry 104, Radio Frequency (RF) circuitry 106, front-end module (FEM) circuitry 108 and one or more antennas 110, coupled together at least as shown. In embodiments where the electronic device 100 is implemented in or by an eNB 110, the electronic device 100 may also include network interface circuitry (not shown) for communicating over a wired interface (for example, an X2 interface, an S1 interface, and the like).

The application circuitry 102 may include one or more application processors. For example, the application circuitry 102 may include circuitry such as, but not limited to, one or more single-core or multi-core processors 102a. The processor(s) 102a may include any combination of general-purpose processors and dedicated processors (e.g., graphics processors, application processors, etc.). The processors 102a may be coupled with and/or may include computer-readable media 102b (also referred to as "CRM 102b", "memory 102b", "storage 102b", or "memory/storage 102b") and may be configured to execute instructions stored in the CRM 102b to enable various applications and/or operating systems to run on the system.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries. Bands may further include IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features described herein are defined for the network side, such as Access Points, eNodeBs, etc. Further, a User Equipment (UE) may take this role as well and act as an Access Point, eNodeB, etc. I.e., some or all features defined for network equipment may be implemented by a UE.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuitry 104 may interface with the application circuitry 102 for generation and processing of the baseband signals and for controlling operations of the RF circuitry 106. For example, in some embodiments, the baseband circuitry 104 may include a third generation (3G) baseband processor 104a, fourth generation (4G) baseband processor 104b, fifth generation (5G) baseband processor 104c, and/or other baseband processor(s) 104d for other existing generations, generations in development or to be developed in the future (e.g., sixth generation (6G), 7G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, and the like, which are supported over a wideband carrier centered around a carrier frequency. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may include elements for compression/decompression and echo cancellation and may include other suitable processing elements in other embodiments. The baseband circuitry 104 may further include computer-readable media 104g (also referred to as "CRM 104g", "memory 104g", "storage 104g", or "CRM 104g"). The CRM 104g may be used to load and store data and/or instructions for operations performed by the processors of the baseband circuitry 104. CRM 104g for one embodiment may include any combination of suitable volatile memory and/or non-volatile memory. The CRM 104g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 104g may be shared among the various processors or dedicated to particular processors. Components of the baseband circuitry 104 may be suitably combined in a single chip, a single chipset, or disposed on a same circuit board in some embodiments. In some embodiments, some or all of the constituent components of the baseband circuitry 104 and the application circuitry 102 may be implemented together, such as, for example, on a system on a chip (SOC).

In some embodiments, the baseband circuitry 104 may provide for communication compatible with one or more radio technologies. For example, in some embodiments, the baseband circuitry 104 may support communication with an E-UTRAN and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc., to facilitate the communication with the wireless network. RF circuitry 106 may include a receive signal path that may include circuitry to down-convert RF signals received from the FEM circuitry 108 and provide baseband signals to the baseband circuitry 104. RF circuitry 106 may also include a transmit signal path that may include circuitry to up-convert baseband signals provided by the baseband circuitry 104 and provide RF output signals to the FEM circuitry 108 for transmission. RF circuitry 106 may be configured to communicate with wireless networks over a wideband carrier, centered around a carrier frequency.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion, respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a of the transmit signal path may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect, as other types of frequency synthesizers may be suitable. For example, synthesizer circuitry 106d may be a delta-sigma synthesizer, a frequency multiplier, or a synthesizer comprising a phase-locked loop with a frequency divider. The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the application circuitry 102 depending on the desired output frequency. In some embodiments, a divider control input (e.g., N) may be determined from a look-up table based on a channel indicated by the application circuitry 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path that may include circuitry configured to operate on RF signals received from one or more antennas 110, amplify the received signals and provide the amplified versions of the received signals to the RF circuitry 106 for further processing. FEM circuitry 108 may also include a transmit signal path that may include circuitry configured to amplify signals for transmission provided by the RF circuitry 106 for transmission by one or more of the one or more antennas 110. In some embodiments, the FEM circuitry 108 may include a TX/RX switch to switch between transmit mode and receive mode operation. The FEM circuitry 108 may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the electronic device 100 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 100 may include network interface circuitry. The network interface circuitry may be one or more computer hardware components that connect electronic device 100 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

Figure 2:
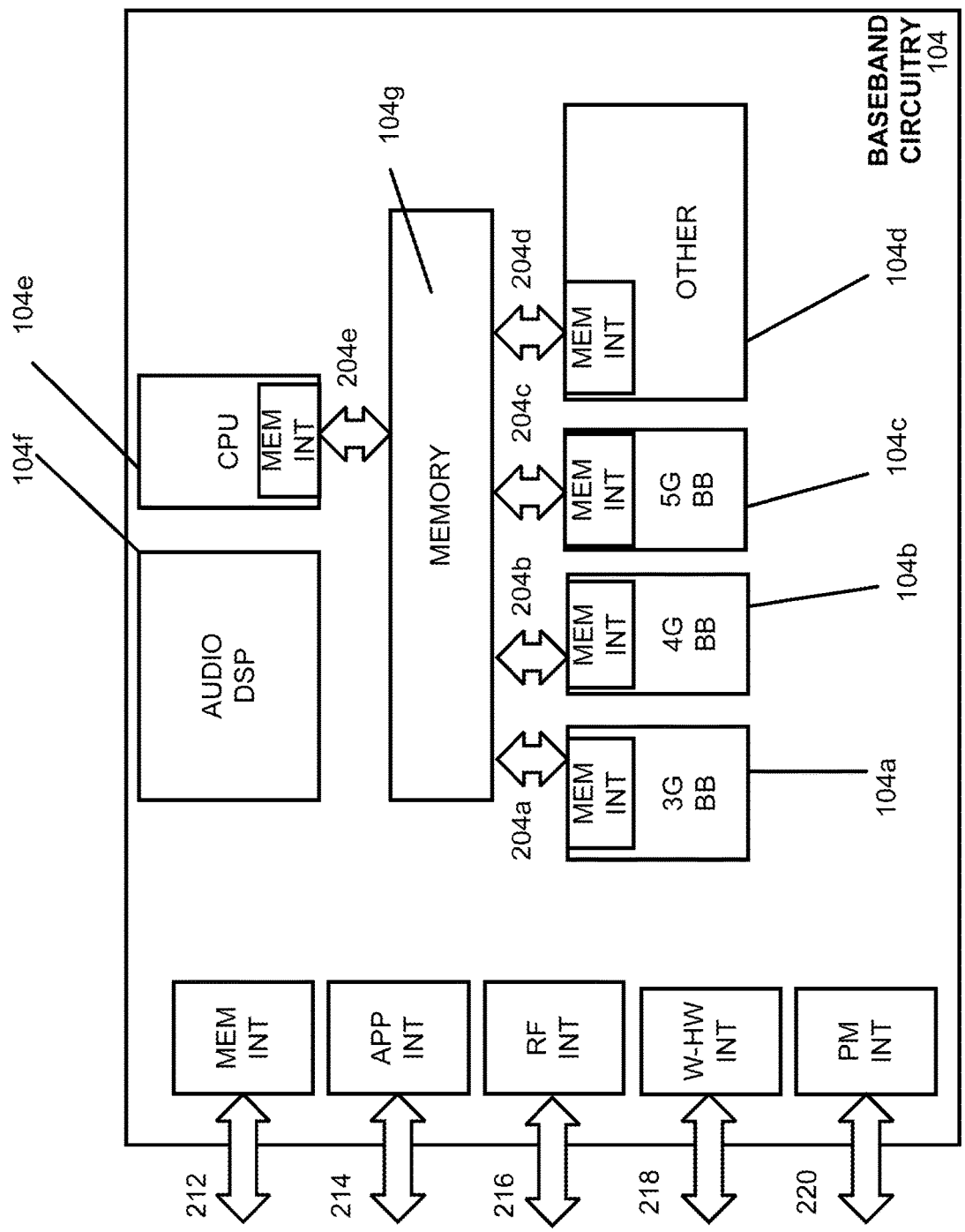
FIG. 2 depicts example interfaces of baseband circuitry in accordance with some embodiments.

FIG. 2 illustrates example interfaces of baseband circuitry in accordance with some embodiments. As discussed above, the baseband circuitry 104 of FIG. 1 may comprise processors 104a-104e and a memory 104g utilized by said processors. Each of the processors 104a-104e may include a memory interface, 204a-204e, respectively, to send/receive data to/from the memory 104g.

The baseband circuitry 104 may further include one or more interfaces to communicatively couple to other circuitries/devices, such as a memory interface 212 (e.g., an interface to send/receive data to/from memory external to the baseband circuitry 104), an application circuitry interface 214 (e.g., an interface to send/receive data to/from the application circuitry 102 of FIG. 1), an RF circuitry interface 216 (e.g., an interface to send/receive data to/from RF circuitry 106 of FIG. 1), a wireless hardware connectivity interface 218 (e.g., an interface to send/receive data to/from Near Field Communication (NFC) components, Bluetooth® components (e.g., Bluetooth® Low Energy), Wi-Fi® components, and other communication components), and a power management interface 220 (e.g., an interface to send/receive power or control signals to/from a power management controller (PMC)).

One approach to supporting wide bandwidth in a base station, such as one or a few GHz of contiguous spectrum, is to first define a reasonable maximum bandwidth per component carrier (CC), e.g., around 100 MHz. Utilization of the wide bandwidth may then be achieved by aggregating component carriers via carrier aggregation (CA) or dual connectivity. Any UE in communication with the base station may be required to support the maximum CC bandwidth, with the base station configuring CA to achieve a wider bandwidth.

However, operating wide bandwidth via CA of narrow bandwidth CCs may be relatively inefficient in terms of operation complexity, signaling overhead, and resource utilization. Carrier aggregation techniques operate each CC as a separate cell, with each CC having its own PHY (physical), MAC (medium access control)/RLC (radio link control) and RRC (radio resource control) protocol entities. As the number of CCs increases, the associated overhead likewise increases.

Thus, it can be desirable to configure a base station to operate in wide bandwidth via a single wideband carrier configuration centered around a channel frequency, with a relatively small number of protocol entities. Overhead associated with scheduling DCI (downlink control information), UE feedback, CRC (cyclic redundancy checks) and L2/L3 signaling may be decreased by reducing the number of configured CCs. A single entity L1/L2/L3 protocol stack can instead manage the entire wide bandwidth. Whether to operate in a single wide carrier or multiple carrier configuration can be up to the network, considering deployment and service scenarios, and the base station's implementation specifics.

To support wide bandwidth operation in a base station, a connecting UE's bandwidth capability should be taken into account. It may not be realistic to require all UEs connecting to a supporting base station to support the entire wide bandwidth in a single wideband channel, due to potential issues in terms of complexity and cost. Instead, each connecting UE's bandwidth capability may vary, with different UEs potentially supporting maximum CCs of 20 MHz, 50 MHz, 100 MHz, 500 MHz, 1 GHz, 2 GHz, 5 GHz, and so on. For example, where a base station supports a 1 GHz contiguous channel bandwidth on a single wide carrier, UEs with maximum CC bandwidth capability of 100 MHz or 500 MHz should be able to connect. Depending on the bandwidth capability of each UE connecting to the base station, the base station may configure different CC bandwidths to each different UE independent of the other UEs, each CC being within the base station's wideband carrier.

Operation of the devices illustrated in FIGS. 1 and 2 will be described in further detail with respect to FIGS. 3-6 in accordance with some embodiments.

Figure 3:
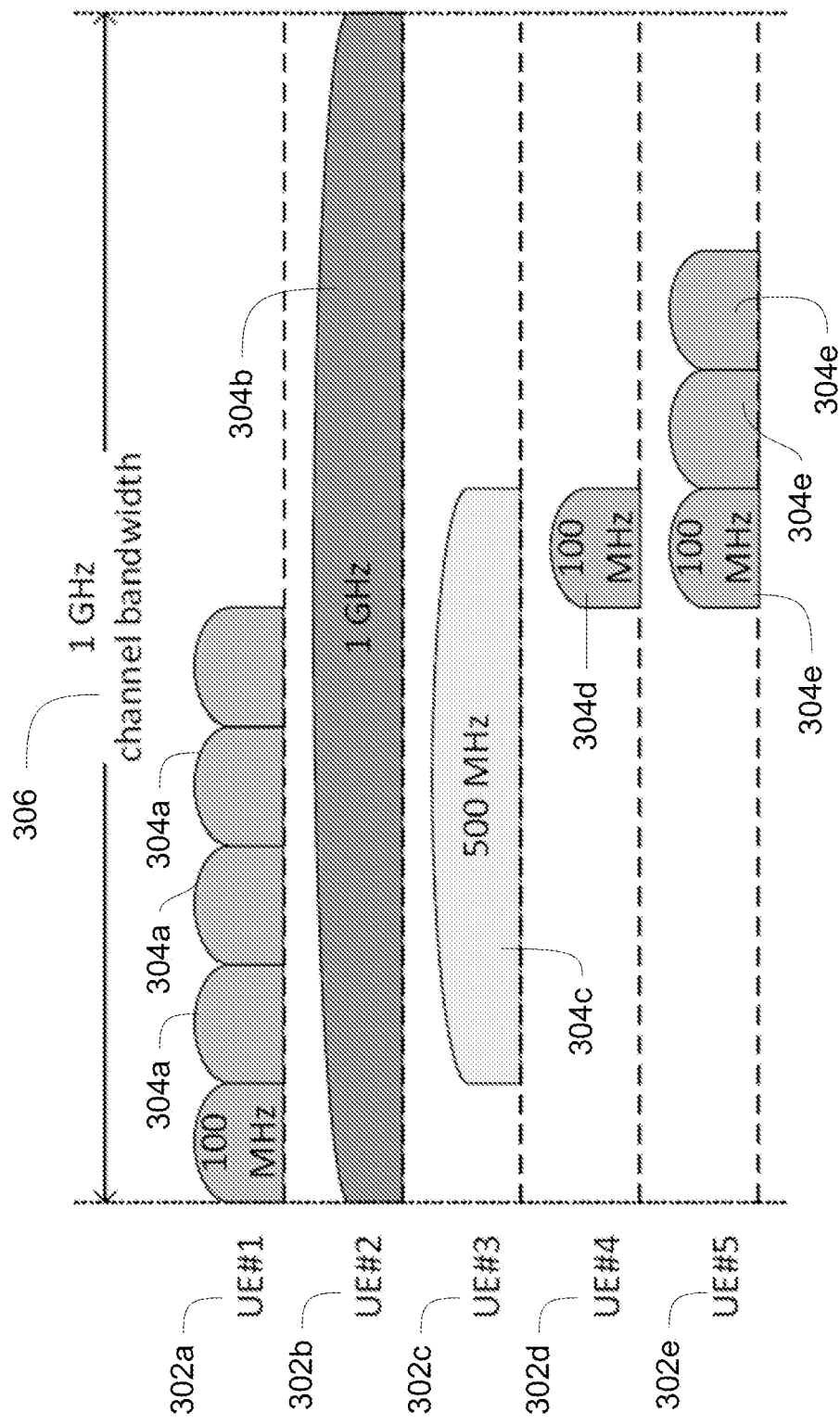
FIG. 3 depicts a series of user equipment (UE) bandwidth allocations in accordance with some embodiments.

FIG. 3 describes various bandwidth configurations for various UEs in accordance with some embodiments. In particular, FIG. 3 illustrates that UEs 302a-302e are each configured with different bandwidths 304a to 304e. In some embodiments, the base station may configure the UEs 302a-302e by generating configuration information and transmitting the configuration information to respective UEs by RRC signaling or, potentially, L1/L2 signaling. As will be seen herein, each UE may have a downlink channel or channels that are separate from the UE's uplink channel(s). Furthermore, each downlink channel and uplink channel may have a different bandwidth and carrier (or center) frequency. The configuration information may separately configure one or more downlink channels, including each downlink channel bandwidth and carrier frequency, from one or more uplink channels, similarly including each uplink channel bandwidth and carrier frequency. In some embodiments, a downlink configuration information may be provided to configure one or more downlink channels, and an uplink configuration information may be provided to configure one or more uplink channels. In such embodiments, the configuration information comprises the downlink configuration and uplink configuration. The configuration information may be transmitted from the base station to the receiving UE as a single aggregated configuration information, or as discrete or separate transmissions of the downlink configuration and uplink configuration.

FIG. 3 also shows that UEs 302a-302e can each be independently configured in a single carrier or multiple carrier (optionally using carrier aggregation) mode, e.g., based upon the specific capabilities of the UEs 302a-302e, as will be explained below. Thus, within a single wideband carrier 306 for a base station, some UEs may be configured with a single component carrier (CC), such as UEs 302b-302d (UE #2, #3, and #4) configured with respective CCs 304b-304d. Other UEs, for example UE 302a and UE 302e, may be configured with multiple CCs (UE #1, #5). For example, UE 302a may be configured with five CCs, noted, generically, as CCs 304a; and UE 302e may be configured with three CCs, noted generically as 304e.

The wideband carrier 306 may be centered around a carrier frequency and have a bandwidth defined by the possible frequency spread above and below the carrier frequency. For example, the 1 GHz wideband carrier 306 depicted in FIG. 3 may have a center frequency of 3 GHz, with 500 MHz of bandwidth extending above and below the center frequency. In such a configuration, wideband carrier 306 may extend from 2.5 GHz to 3.5 GHz, with a center carrier frequency at 3 GHz. Other embodiments may utilize other total bandwidths and carrier frequencies.

In embodiments, each CC may vary in size, up to the bandwidth of wideband carrier 306 of the base station. Each CC (and its associated UE) may be configured independently with its own individual bandwidth within wideband carrier 306 and its corresponding bandwidth. For example, in FIG. 3 UE 302a is configured with five CCs 304a, with each CC being 100 MHz in width. Collectively, the five CCs 304a combine to have a total bandwidth of 500 MHz. UE 302b is configured with a single CC 304b that is 1 GHz, equal in bandwidth to the bandwidth of wideband carrier 306. UE 302c has a single CC 304c that is 500 MHz, half the size of wideband carrier 306. UE 302d is configured with a single CC 304d that is 100 MHz in width. UE 302e is configured with three CCs 304e, with each CC being 100 MHz in width. Collectively, the three CCs 304e combine to have a total bandwidth of 300 MHz. For UEs that employ multiple CCs, such as UEs 302a and 302e, carrier aggregation may be employed to allow for information transfer in excess of the capacity of a single CC.

Where a UE supports wide-bandwidth CCs, a single wide-bandwidth CC may be employed to cover the same bandwidth that otherwise would require multiple CCs with narrower bandwidths in a CA scheme. In FIG. 3, UE 302a contrasts with UE 302c. Both UEs consume 500 MHz total bandwidth of the base station's wideband carrier 306. However, UE 302a uses a series of 100 MHz bandwidth CCs in a CA configuration to aggregate to 500 MHz, while UE 302c uses just a single CC 304c that occupies 500 MHz of bandwidth. Use of a single wide bandwidth CC may allow greater bandwidth when compared to a series of smaller CCs in a CA configuration, as the single wide bandwidth CC may only require signaling for one CC. Each CC in a CA configuration may require separate signaling, potentially exacting a greater signaling overhead when compared to a single wide bandwidth CC.

Various CCs may each be centered around a different frequency band or region within the total bandwidth of wideband carrier 306. In the example of FIG. 3, CCs 304a-304e are located in different bandwidth sections of wideband carrier 306. The CCs 304a of UE 302a start at the bottom (left-most) portion of wideband carrier 306. Each CC is contiguous with respect to each other, and extend to consume half of the bandwidth of the wideband carrier 306. Similarly, the single 500 MHz CC 304c of UE 302c consumes half of the total bandwidth of wideband carrier 306. CC 304c is shifted right in FIG. 3, indicating that it is situated within a different portion of the bandwidth of wideband carrier 306 from CCs 304a. CC 304d, associated with UE 302d, only consumes 100 MHz of total bandwidth, and is situated approximately in the center of the bandwidth of wideband carrier 306. CCs 304e likewise start at the same bandwidth point as CC 304d, but contiguously consume 300 MHz of wideband carrier 306. Finally, CC 304b of UE 302b consumes the entire 1 GHz bandwidth of wideband carrier 306, and so is coterminous with wideband carrier 306. These various configurations may be supplied by a base station to each respective UE, e.g., based upon each UE's individual capabilities.

Each CC may be considered a separate cell for signaling purposes. Thus, each CC typically includes its own hybrid automatic repeat request (HARQ) process, used to confirm that transmitted data is received error-free and, if not, retransmit it. Each CC may also include downlink control information (DCI), used to signal the receiver which resource blocks (RBs) and modulation coding scheme (MCS) was employed. This enables the receiver to decode the transmitted information. As each HARQ process and DCI consumes bandwidth that cannot be used for transmission of user data, employing wide bandwidth CCs may reduce overhead from multiple HARQ processes and DCIs. More of the available bandwidth is thus freed to be used for user data, and available spectrum is used more efficiently.

It should be understood that each of the CC configurations of UEs 302a to 302e depicted in FIG. 3 are mere examples, and not intended to be limiting. Depending on network deployments and spectrum arrangement, a base station may configure either a single wide CC, such as CC 304b for UE 302b, or CC 302c for UE 302c, or multiple CCs per UE, such as CCs 304a and 304e for UEs 302a and 302e, respectively, in order to efficiently support wide channel bandwidth. Further variations are possible, and the total of five UEs 302a-302e is likewise for example purposes only, and not intended to be limiting.

UEs 302a-302e may be configured with different carrier aggregation modes and/or different bandwidth per CC. Carrier aggregation configuration does not necessarily imply that each of the aggregated carriers are supported by separate RF components (also called an RF chain). In cases of contiguous spectrum, UEs with either single or multiple RF chains may be configured to support carrier aggregation. Whether to operate in a single wideband carrier or multiple (potentially narrower) carrier mode may be determined with respect to operations in the baseband circuitry and L1/L2/L3 protocols. Even when a UE with a single RF chain can support a wide bandwidth of, for example, 1 GHz, baseband implementation based on a multiple carrier mode may nevertheless be employed due to benefits of sharing a baseband implementation for both non-contiguous and contiguous spectrum arrangements. Supporting a high sample rate and large FFT size with a single baseband circuitry for a wideband carrier may become increasingly complex as bandwidth increases.

Supporting a wide CC bandwidth via a single wideband carrier 306 may lead to less overhead in signaling and operations compared to configuring UEs to operate across multiple CCs. A single DCI can schedule over the wideband carrier 306 with less overhead than using multiple DCIs in a CA configuration. A single power control process for UL data and UL control channels can cover the configured channel bandwidth, instead of maintaining multiple power control processes for each CC. A single set of L1/L2/L3 protocol entities may be sufficient to support a high data rate corresponding to a wide channel bandwidth, and associated mobility procedures. Lastly, a single RRC configuration can configure the parameters and procedures over the wideband carrier, instead of multiple RRC configurations, each associated with a CC.

In embodiments, the base station supports simultaneous connections with UEs that each may have a different CC configuration of at least bandwidth and/or carrier frequency. As used herein, "a simultaneous connection" refers to a situation in which multiple UEs each have an established and ongoing connection with the base station at the same time. UEs having a simultaneous connection may or may not transmit/receive communications at the same time. Furthermore, UEs having a simultaneous connection may or may not have CCs that have overlapping bandwidth. For example, UEs 302a-302e in FIG. 3 are all considered to be simultaneously connected to the base station. If only UEs 302a and 302e, which do not share any overlapping bandwidth, are connected to the base station, they nevertheless may be simultaneously connected.

Figure 9:
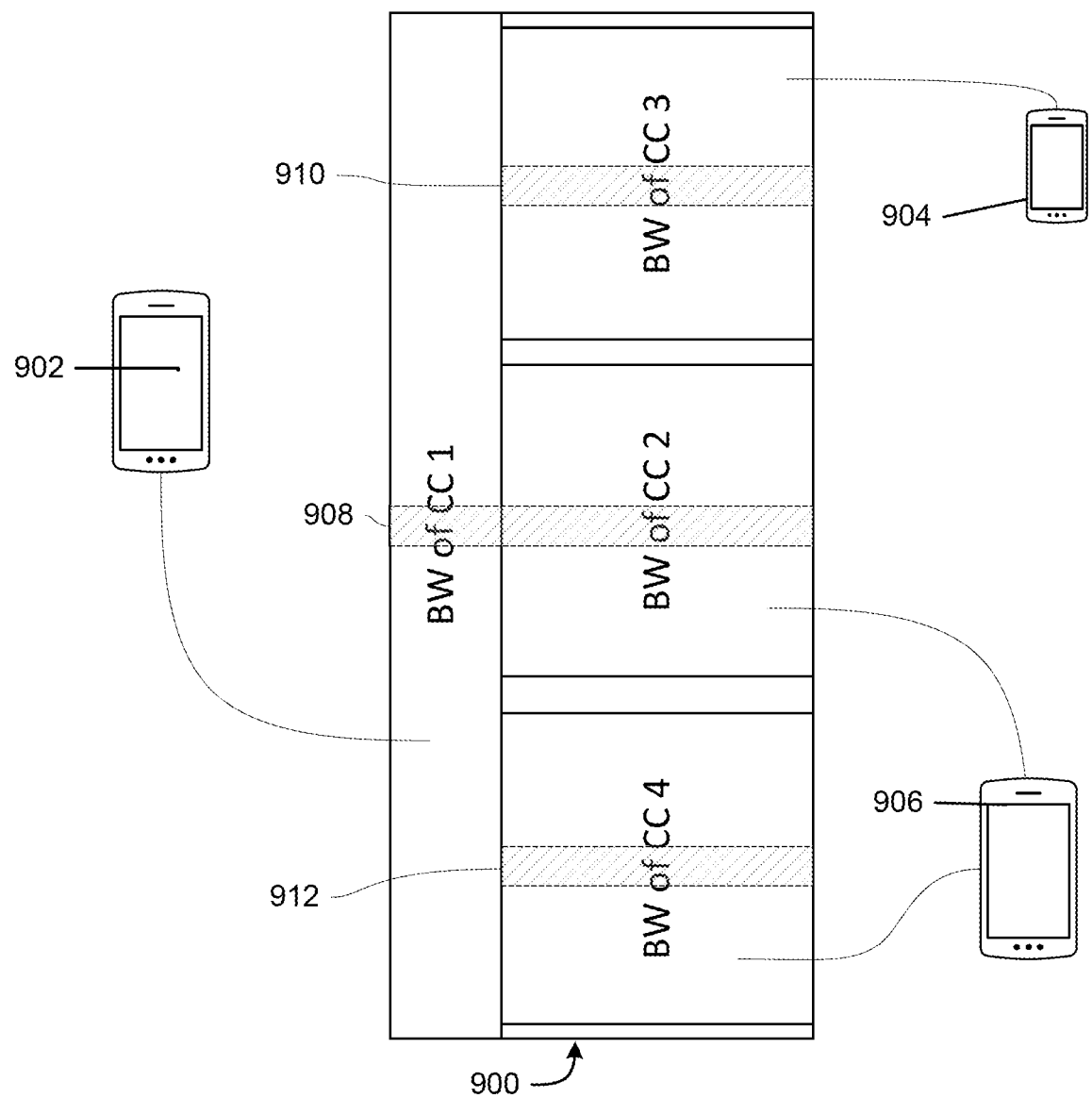
FIG. 9 depicts an arrangement of CCs where several narrow bandwidth CCs overlap a wide bandwidth CC.

Simultaneous connections may sometimes result in an overlapping of CCs, such as narrower bandwidth CCs being within the bandwidth of a wide bandwidth CC. This is depicted in FIG. 9, where UEs 904 and 906 occupy CCs 2-4 that overlap the wide bandwidth CC 1 of UE 902. Each UE may be made aware of the presence of other overlapping CCs, to allow each UE to properly map resources, including wideband data allocation. Each CC may include an always-on signal around the CC's carrier frequency, to serve as a beacon. The resource allocation of these always-on signals may be communicated to UEs with CCs that envelop the narrower CCs, so the UEs are aware of these unusable bandwidth portions.

For example, UE 902 utilizes a wide bandwidth CC 1 that encompasses other CCs 2-4, which are used by UEs 904 and 906. CC 1 has always-on signal 908, which is shared with narrow bandwidth CC 2, as CC 1 and CC 2 are centered on the same carrier frequency. CCs 3 and 4, however, have center frequencies that differ from CCs 1 and 2. CC 3, then, has always-on signal 910, and CC 4 has always-on signal 912. Always-on signals 910 and 912 overlap with bandwidth of CC 1 that could otherwise be used for data, and so UE 902 may be signaled of the presence of always-on signals 910 and 912 to allow UE 902 to avoid interfering with the always-on signals.

For data scheduling, transmission of DL and UL grants may depend upon CC configuration. For example, for UE 302a, DL and UL grants may be separately transmitted on each of the five CCs. For UE 302b, a single DCI may be used to schedule transmission over the entire 1 GHz bandwidth CC. Alternatively, where data will be confined to a portion of the 1 GHz CC (as will be discussed below with reference to transport block scheduling), the DCI may indicate a smaller resource block (RB) allocation confined to the portion of the 1 GHz CC. The DCI may also indicate a frequency hopping scheme where implemented.

Although each CC may be operated as an individual cell, the base station may configure each CC with an identical cell ID depending upon UE capabilities. For each UE, a DCI may have a cell ID and control channel element (CCE) resource mapping corresponding to the CC where the DCI is transmitted. The DCI for UE 302a may have a cell ID and control channel element (CCE) resource mapping that corresponds to the component carrier where the DCI is transmitted. Where the UE has a single CC, as in the case of UE 302b, the DCI may simply use the pre-determined single cell ID. CCEs for different DL control channels may be multiplexed within a physical resource block (PRB) with mapping depending upon the cell ID. In such cases, CCEs should be mapped so that cell IDs for the various CCs do not collide, such as where UE 302b multiplexes with other UEs that use multiple CCs. This may include a configuration where a UE such as UE 302b uses the cell ID of wideband carrier 306, and other CCs have different cell IDs.

Figure 4:
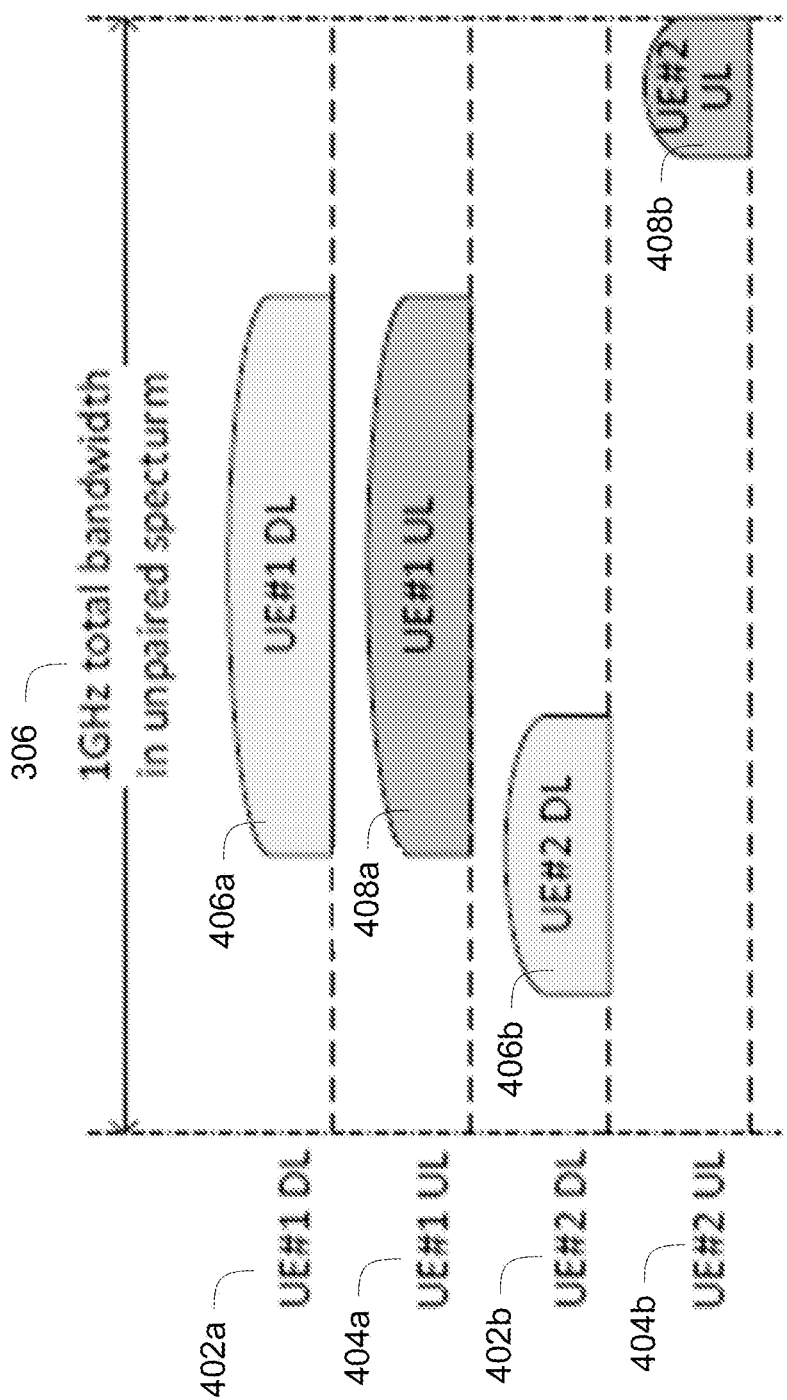
FIG. 4 depicts a series of UE bandwidth allocations for uplink and downlink channels in accordance with embodiments.

FIG. 4 illustrates a configuration scheme in which various UEs are configured with different CCs for transmission and reception in accordance with some embodiments. In particular, UE #1 is configured with a downlink (DL) channel 402a and an uplink (UL) channel 404a. The downlink channel may be for transmissions originating in the base station to be received by the UE. The uplink channel may be for transmissions originating in the UE to be received by the base station. Downlink channel 402a has a CC 406a, and uplink channel 404a has a CC 408a. Likewise, UE #2 is configured with a downlink channel 402b with a corresponding CC 406b, and an uplink channel 404b with a corresponding CC 408b. As can be seen in FIG. 4, for UE #1, CCs 406a and 406b are coterminous, having the same center carrier frequency and bandwidth. In contrast, UE #2 has a CC 406b for downlink that is both centered on a different carrier frequency and has greater bandwidth than CC 408b for uplink. CC 406b is completely distinct and not overlapping from CC 408b. In embodiments, all CCs 406a, 406b, 408a and 408b may be simultaneously established with and connected to one base station.

FIGS. 3 and 4 illustrate how a base station may configure multiple connections with a plurality of UEs in embodiments, with each UE potentially having different and arbitrary capabilities in terms of CC frequency, frequency region (s), bandwidth, number of CCs, and/or encoding schemes, etc., and whether carrier aggregation (CA) is performed. The capabilities of each UE may vary. As a UE contacts a base station, it may inform the base station of its capabilities to enable the base station to specify a configuration to the UE that is within the UE's capabilities. The base station may include decoding circuitry, part of baseband circuitry 104, to decode the configuration from the UE. Each configuration may be unique to its associated UE. As shown in FIG. 3, an implementing base station may simultaneously support a variety of different CCs and CA configurations.

In cases where a base station supports blocks of non-contiguous spectrum, wide bandwidth operation can be supported in a multiple CC mode in accordance to the spectrum arrangement of the non-contiguous carriers. In some embodiments, this may include the selective use of CA. In cases of contiguous spectrum, the base station may still determine to allocate the spectrum using a CA scheme for some or all connected UEs using multiple CCs. Alternatively, the base station may determine to operate all UEs with each having a single CC. Depending upon UE support, the base station may employ wide bandwidth CCs. The determination of which configuration or configurations to employ may be determined by each base station, considering both network requirements and UE capabilities and needs. For example, in a scenario where only one UE connected to a base station supports a wide bandwidth CC and multiple other UEs are connected that only support narrower CCs but support CA, the base station may determine it better for network management purposes that all UEs be configured using multiple narrow bandwidth CCs and CA.

Figure 5:
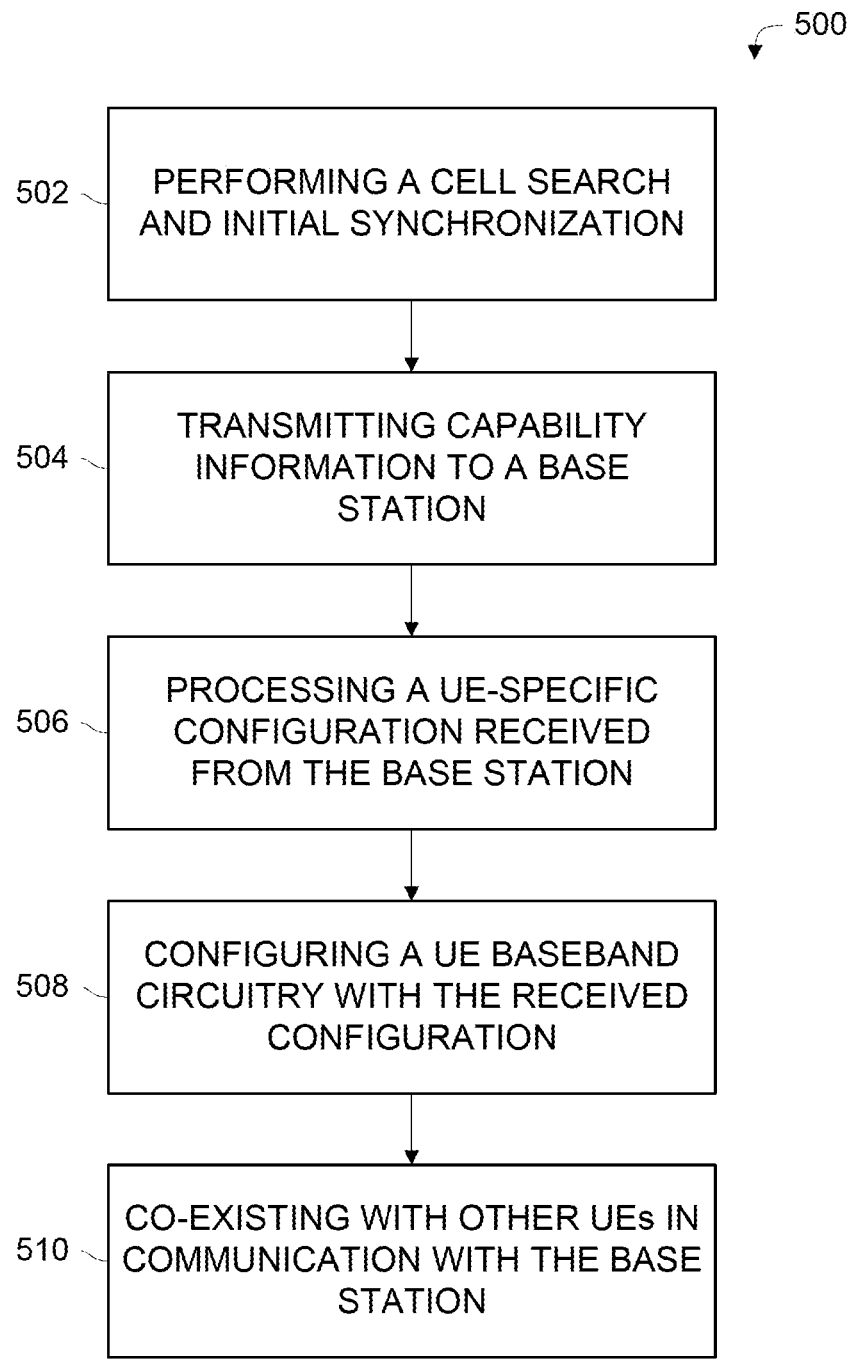
FIG. 5 depicts a method for a UE to interact with a wideband carrier-capable base station in accordance with some embodiments.

FIG. 5 illustrates an operation 500 that may be carried out by a UE in some embodiments to communicate with a base station that supports a wide bandwidth carrier and a per-UE specific configuration. In block 502, the operation 500 may include performing a cell search and initial synchronization with the cell's base station. After successful search and synchronization with the base station, the UE can acquire system information for the base station from a broadcast physical channel or/and a shared physical channel carrying system information. In block 504, the operation 500 may include transmitting capability information to a base station. This information may include the UE's supported maximum bandwidth, maximum supported bandwidth per CC, number of supported CCs for CA, frequency capabilities, channel encoding scheme(s), uplink (UL) and downlink (DL)-specific configurations, etc. The maximum supported CC bandwidth may be within or equal to a wideband carrier 306 supported by the base station. In block 506, the operation 500 may include processing a UE-specific configuration received from the base station, including a first designated CC bandwidth, first designated CC frequency or frequencies, and CA configuration (if used). In block 508, the operation 500 may include configuring a UE baseband circuitry with the received configuration, including the first designated CC bandwidth and/or frequency, and, where multiple CCs are to be used, CA mode in accordance with the received configuration. Finally, in block 510, the operation 500 may include performing transmission and reception from the base station, with the UE simultaneously co-existing with other UEs in communication with the base station. The other UEs may have different CC bandwidths and/or frequencies, as well as CA configuration (if employed).

During configuration in block 508, each CC on the base station may transmit its own DL synchronization signal and physical broadcast channel to carry information essential to the UE for configuration. Alternatively, synchronization signals and physical broadcast channels can be transmitted on the center carrier frequency of wideband carrier 306. In such an arrangement, a UE given a configuration of one or more CCs with frequencies and bandwidths different from wideband carrier 306 would need to retune to a configured CC after initially synchronizing with the base station and receiving a configuration.

The UE may include decoding circuitry to decode transmissions from the base station, encoding circuitry to encode transmissions to the base station, and processing circuitry coupled to the decoding circuitry. The encoding circuitry, decoding circuitry, and processing circuitry may be part of or implemented in baseband circuitry 104, as depicted in FIG. 1. The processing circuitry may perform the cell search and initial synchronization described above with reference to block 502 and configure components of the UE based upon configuration instructions received and decoded by the decoding circuitry from the base station. The processing circuitry may further cause the encoding circuitry to transmit, in an encoded transmission, the capability information described above with reference to block 504.

Figure 6:
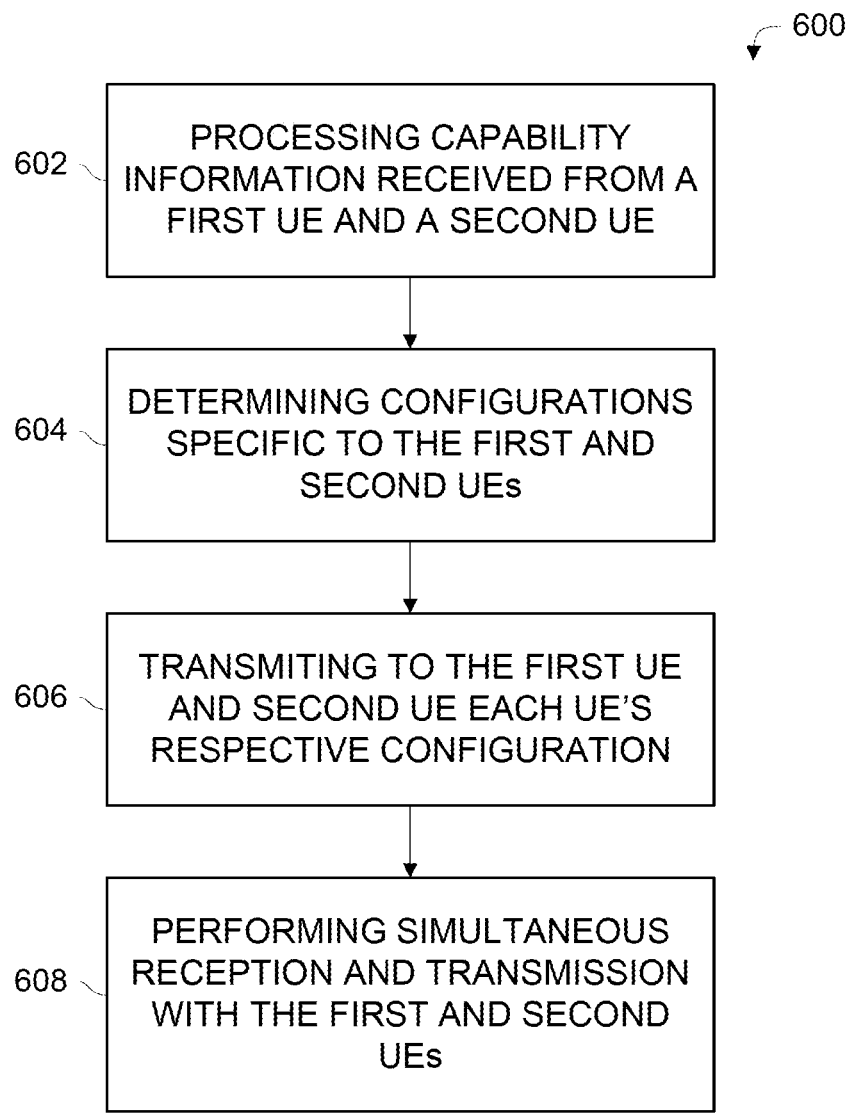
FIG. 6 depicts a method for a base station supporting a wideband carrier to configure a UE in accordance with some embodiments.

FIG. 6 illustrates an operation 600 that may be carried out by a base station in some embodiments that supports a wide bandwidth carrier and multiple UEs, each with a potentially unique configuration. In block 602, the operation 600 may include processing capability information received from a first UE and a second UE. The capability information may relate to each UE's capability, for example, total supported CC bandwidth, frequencies, bandwidths for DL and UL, CA capabilities, etc. In block 604, the operation 600 may include determining configurations specific to the first and second UEs. Each configuration may include information such as selected CC bandwidth(s) and frequency region(s), which may vary for DL and UL, and CA configuration (if used). The configuration can include hopping patterns of the DL and UL frequency regions, respectively, and selected modulation coding scheme s. In block 606, the operation 600 may include transmitting to the first UE and second UE each UE's respective configuration.

In block 608, the operation 600 may include performing simultaneous reception and transmission with the first and second UEs. In doing so, when the configuration includes different channel frequencies for DL and UL, the base station and UE may perform RF switching when transitioning between DL to UL to change the frequency/frequency region in accordance with the DL/UL frequency region and hopping pattern specified in the configuration transmitted from the base station to the UE.

The base station may include encoding circuitry or similar means to encode transmissions on wideband carrier 306, and processing circuitry or similar means to configure a plurality of UEs, such as UES 302*a*-302*e*, for communication in a cell over simultaneous connections. Each UE may be configured based upon the UE's capabilities. The encoding circuitry (or means for encoding) and processing circuitry (or means for configuring) may be part of or implemented in baseband circuitry 104, as depicted in FIG. 1, and is configured as necessary to support wideband carrier 306 centered around a carrier frequency. The encoding circuitry may further encode a first transmission to a first UE from the plurality of UEs using a first bandwidth within wideband carrier 306, and encode a second transmission to a second UE from the plurality of UEs using a second bandwidth within wideband carrier 306.

The methods described above with reference to FIGS. 5 and 6 may be implemented as instructions contained on one or more computer readable media, transitory or non-transitory, that are executable by a UE or base station, respectively. The instructions may be executed by the baseband circuitry, such as a processor that is part of the baseband circuitry, as described with reference to FIG. 1.

As can be seen in the Figures, the bandwidth configured to a UE can be smaller than the wideband carrier of the base station, and can also be smaller than the bandwidth which the UE is capable of supporting. This limited bandwidth operation can help the UE to reduce power consumption by decreasing the RF Tx/Rx bandwidth and the sample rate at baseband.

Support for configuring different bandwidths between DL and UL channels can be considered even for time division duplexing (TDD) unpaired spectrum operations as well as for frequency division duplexing (FDD) paired spectrum operations. Transmission and reception of all DL and UL signals and channels for the UE may be confined within the configured channel bandwidth for DL and UL, respectively. For example, in some embodiments the bandwidth for a DL control channel and the bandwidth for an UL control channel and SRS (sounding reference signal) can be different. Specifically, the bandwidth for DL control channel reception for a UE can be smaller than the DL channel bandwidth configured to the UE for the purpose of power saving. Conversely, the bandwidth for UL control channel and SRS can be as large as the UL channel bandwidth configured to the UE in order to enhance frequency diversity gain for the UL control channel and channel sounding for data transmission.

As with the control channels, the configured bandwidth for DL and UL data channels can be different as well. In some embodiments, the DL channel may support a higher data rate than the UL data channel, and thus a larger bandwidth may be configured in DL than in UL. This is shown for UE 402*b* in FIG. 4. The opposite may also be configured: instances where a larger bandwidth is configured for UL than DL. One possible example is when the UE is located in a stadium and is streaming video of the game in play through the UL data channel.

Exploiting channel reciprocity through channel sounding from an UL SRS for DL scheduling presents a challenge when a smaller bandwidth is configured for UL than DL or a different frequency region is configured between DL and UL in unpaired spectrum operations. In such embodiments, if a channel sounding operation is required, the base station may signal to the UE to activate aperiodic SRS transmission on a corresponding frequency region. In other embodiments, frequency hopping of the UL channel bandwidth configured to the UE may be implemented in a pre-determined periodicity. Frequency hopping of the DL and UL regions configured to the UE may also provide frequency and interference diversity between HARQ retransmissions.

In cases where cell search and initial access is supported on component carriers that may have a smaller bandwidth than wideband carrier 306 (as opposed to just wideband carrier 306), each component carrier may transmit its own DL synchronization signals and physical broadcast channel to carry essential system information. This may, however, increase signaling overhead both in the base station and also any UEs that support wide bandwidth using a single carrier. In some embodiments, the synchronization signals and physical broadcast channel may instead be sent in the center or a single frequency region within the wideband carrier 306. In such embodiments, UEs whose CC bandwidth is smaller than that of wideband carrier 306 would need to re-tune their carrier frequencies to one corresponding to a configured component carrier after completing the cell search.

Such a configuration can be seen from FIG. 9, where a wideband carrier has a center frequency around always-on signal 908. UEs configuring off-frequency narrower CCs, such as UEs 904 and 906, will need to re-tune to the frequencies of always-on signals 910 and 912, respectively, following configuration. This re-tuning of RF carrier frequencies may occur whenever a UE is reconfigured to a different component carrier than the carrier where the UE performed the initial cell search. This is unrelated to whether the synchronization signals are sent on all the component carriers or only in the center of the channel bandwidth.

For data scheduling, RB allocation fields in DL and UL grant DCIs have sizes and definitions corresponding to the respective DL and UL bandwidths configured to a UE. For example, with UE 302*a* in FIG. 3, DL/UL grants may be separately transmitted on each of the five component carriers 304*a*. For UE 302*b*, a single DCI may schedule data transmission over the entire 1 GHz bandwidth of CC 304*b*.

Where the operation bandwidth for UE 302b is tentatively confined to a certain frequency region of 50 MHz BW for both DL and UL, then the DL/UL grant DCIs can have smaller RB allocation fields corresponding to the confined frequency region. If the configured 50 MHz BW frequency region implements frequency hopping, the PRBs indicated by the DCI changes accordingly to correspond to the current frequency region after the frequency hopping. In addition, to support data scheduling over the entire bandwidth configured to UE 302b, an additional DCI format corresponding to the 1 GHz bandwidth can be configured to UE 302b.

For the cell IDs of the component carriers, each component carrier could have an identical cell ID in view of multiplexing the DL control channels for UEs 302a-302b without collision, which can be multiplexed within a same PRB with a randomized resource mapping relying on the cell ID. This restriction may be relaxed if data transmission for UE 302b across multiple CCs can be processed (scrambling, remapping, etc.) with a single cell ID. The single cell ID could be one out of the configured CCs' cell IDs or a pre-determined pseudo cell ID for UE 302b.

Figure 7:
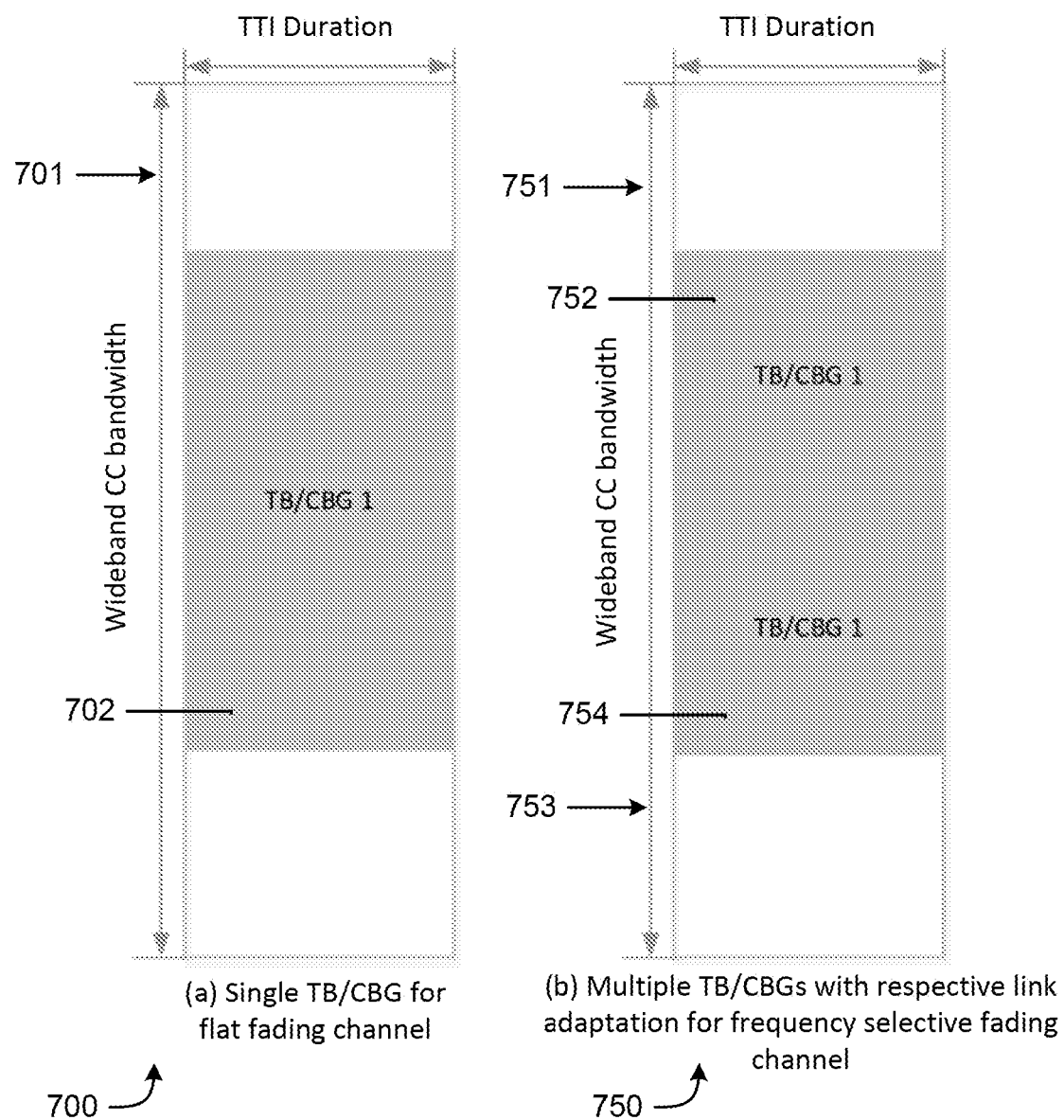
FIG. 7 depicts transport block (TB)/code block group (CBG) scheduling schemes in accordance with some embodiments.
Figure 8:
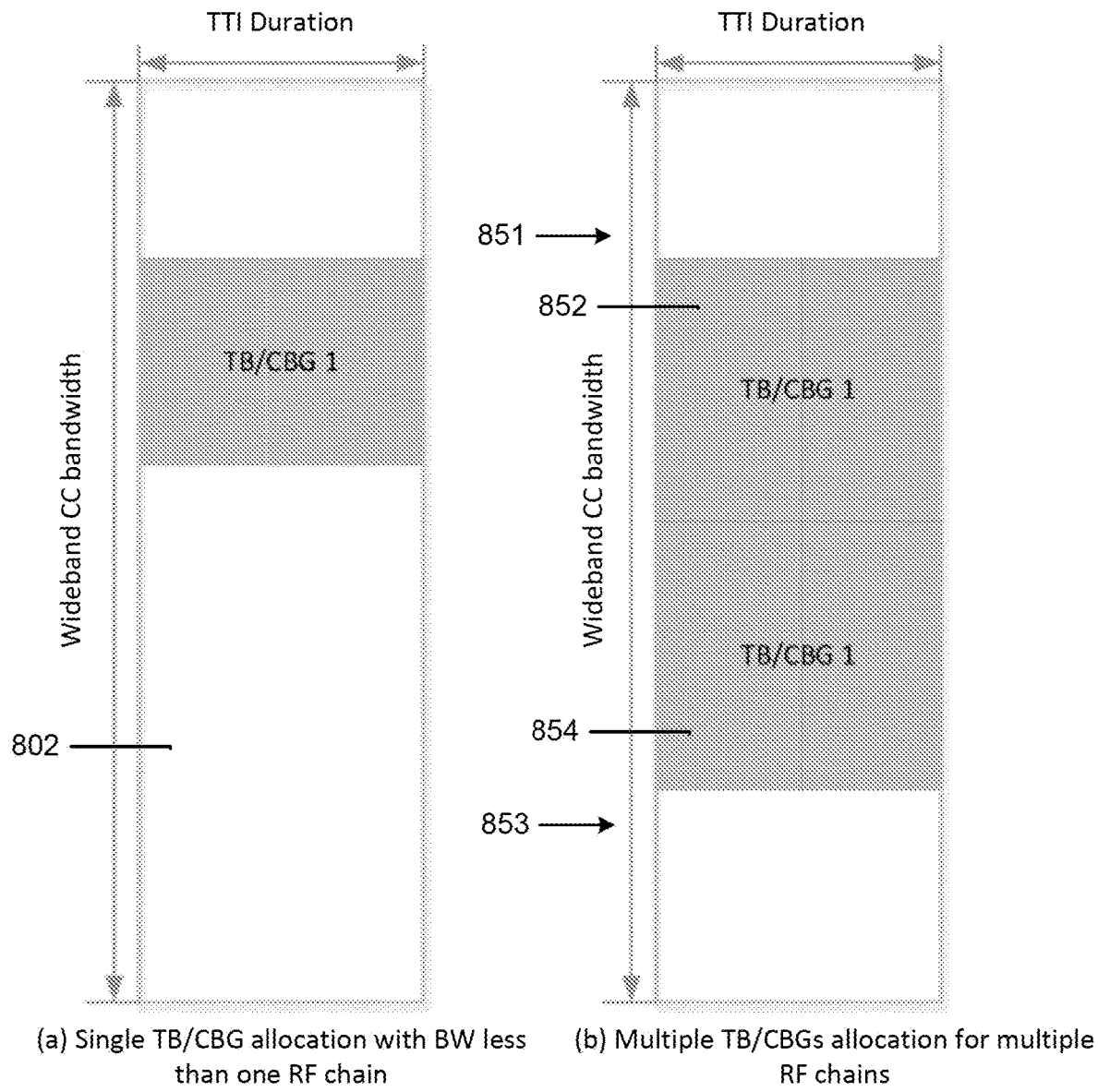
FIG. 8 depicts multiple CC scheduling schemes in accordance with some embodiments.

FIGS. 7-9 describe a unified wideband data scheduling scheme in accordance with some embodiments.

In embodiments, a base station may process capability information that corresponds to a plurality of UEs. The capability information may include, for each UE in the plurality of UEs, a number of supported CCs, a bandwidth supported for each CC, a number of supported transport blocks (TB) or code block groups (CBG), and supported TB/CBG size. The bandwidth for each CC and TB/CBG size may be equal to or less than the bandwidth of wideband carrier 306. The base station may further generate TB/CBG configuration information for each UE, and transmit the configuration information to the UE. The base station still further may process one or more TB/CBGs received from at least two UEs of the plurality of UEs within a single hybrid automatic repeat request (HARQ) process. This processing by the base station may be carried out in a baseband circuitry, such as baseband circuitry 104, which may further include encoding circuitry, decoding circuitry, and processing circuitry or one or more processors, as shown in FIG. 1.

A base station queries each UE requesting a connection for their capabilities. UE capabilities may include each UE's supported number of component carriers (CCs), maximum supported bandwidth of each CC, maximum supported number of transport blocks (TBs) or code block groups (CBGs) and maximum supported TB/CBG size. The base station may then transmit to each UE a TB/CBG configuration that is specific to each UE, and exchange one or more TB/CBGs with each of the plurality of UEs in a single HARQ process. Each TB/CBG has an associated modulation coding scheme (MCS) that may differ from other TB/CBGs.

As described above with reference to FIGS. 3 and 4, for a base station that supports a wideband carrier (e.g. wideband carrier 306), different UE configurations may be supported. In a first example configuration, a UE may be configured with one wideband carrier utilizing multiple RF chains. In a second example configuration, a base station simultaneously operates a wideband CC for UEs with a single RF chain, and as a set of intra-band contiguous CCs with CA for UEs with multiple RF chains.

In the first example configuration, a UE with multiple RF chains may be configured with one wideband carrier so that in a transmission time interval (TTI), e.g., slot or subframe, the multiple RF chains transmit or receive signals scheduled in different channel frequencies that are part of the wideband carrier 306. Because multiple RF chains are employed by the UE, the equivalent channels differ from each other, and the base station may need to account for this in DL data scheduling and UL data reception. As stated above, the UE may signal to the base station its capability with respect to the supported number of RF chains and bandwidth of each respective RF chain.

In the second example configuration, a set of contiguous intra-band CCs may be configured to UEs with multiple RF chains so that CA may be employed for these UEs. For UEs with a single RF chain, a single wideband CC may be configured. However, data scheduling may need to account for varying channel conditions across the wideband CC bandwidth.

Data scheduling in these example configurations can be addressed with a unified wideband data scheduling scheme. A unifiend wideband data scheduling scheme may account for channel variation caused by multiple RF chains (for UEs with multiple RF chains) or wideband data allocation (for UEs with single RF chain). In case of overlaid CCs deployment, the unified scheduling scheme enables proper resource mapping for wideband data scheduling.

In the unified data scheduling scheme, a base station may schedule multiple transport blocks (TB) or code block groups (CBG) in one HARQ process to a UE. Each TB or CBG consists of at least one code block. Each TB/CBG is associated with a modulation coding scheme (MCS), i.e., code rate, and allocated respective resource blocks. With multiple TBs/CBGs with different MCS in one HARQ process, the base station may schedule different data rates for different parts of the wideband allocation, also known as link adaptation. Each UE with multiple RF chains signals the number of TBs/CBGs and number of RBs per TB/CBG which are scheduled in a TTI to the base station. This information may correspond to the number of RF chains and maximum baseband bandwidth processed by each respective RF chain.

The base station may allocate wideband data to UEs with single or multiple RF chains in a unified manner. With multiple TB/CBGs of independent link adaption in one HARQ, the base station may employ different MCSs for different parts of the wideband data allocation. Moreover, subject to the constraints on maximum number of TBs/CBGs and maximum RBs per TB/CBG in a HARQ, the base station may schedule multiple TBs/CBGs in a HARQ process to UEs with multiple RF chains. With separate link adaptation parameters for different TBs/CBGs, channel discontinuation between TBs/CBGs are naturally considered by the base station for uplink data reception and scheduling. Compared to CA, wherein an independent HARQ process is used per CC, the unified data scheduling scheme may result in a reduced number of HARQ processes, i.e., 1 HARQ per wideband CC. This reduction also significantly reduces the MAC processing complexity of both the base station and any connected UEs.

To implement data scheduling solutions described herein, information elements are defined that may be used in data scheduling control signaling. For example, a control information element may include data scheduling information such as, for example, a HARQ process index and scheduling information per scheduled TB/CBG. The scheduling information with respect to each TB/CBG may include a respective TB/CBG index, MCS, resource block (RB) allocation, or a new data indicator that may be used for TB/CBG HARQ combining at the receiver (either UE or base station, depending on which is transmitting and receiving). The per-TB/

CBG MCS and resource block allocation information may enable independent link adaptation on a TB/CBG level in a HARQ process.

Where a base station serves multiple UEs, each potentially with a different CC configuration, some potentially employing CA, the base station may employ a scheme for unified data scheduling. Data is transferred from upper layers, such as the MAC layer discussed above, to the PHY layer for transmission between a UE and the base station. This data is transmitted using a transport block (TB), the size of which is determined by the number of allocated resource blocks (RB), as well as the MCS. Each TB may have a different size and MCS from other TBs. Multiple TBs may be scheduled in a single HARQ process, helping to save overhead.

FIG. 7 depicts two different possible example TB/CBG scheduling configurations for a given transmission time interval (TTI) for a UE with a single radio chain in communication with a base station using a single wideband CC 701. In configuration 700, the channel is flat fading, and a single TB/CBG 702 occupying a substantial portion of the bandwidth of CC 701 is depicted. The TB/CBG 702 would have a designated bandwidth, size and single MCS applied to all frequency parts of the channel, as determined by the base station. Because the channel is flat fading, CC 701 is substantially consistent across its bandwidth. TB/CBG 702 can be configured with a relatively wide bandwidth and MCS suitable to the channel quality without concern of substantial loss in any particular portion of the channel that would necessitate multiple retransmissions. Although configuration 700 depicts TB/CBG 702 occupying less than the full bandwidth of CC 701, TB/CBG 702's bandwidth could extend to cover the entire bandwidth of CC 701, provided the signal conditions of CC 701 so permit.

Configuration 750 depicts two TB/CBGs 752 and 754, which may be utilized where the channel quality of CC 701 presents frequency selective fading. Here, first CC segment 751 may be of a higher quality than second CC segment 753. Consequently, transmissions spanning into second CC segment 753 may require a different MCS than transmissions spanning into first CC segment 751 to ensure reliable transmission with minimal retransmissions. TB/CBG 752, lying within first CC segment 751, may be configured to use an aggressive MCS that enables higher throughput with the sacrifice of signal robustness, as first CC segment 751 is relatively clean, and so noise losses are minimal. Conversely, TB/CBG 754, lying within noisier second CC segment 753, may be configured to use a robust MCS that sacrifices throughput, but is able to ensure a reliable transmission over the noise level of second CC segment 753.

Both TB/CBG 752 and 754 occupy the same bandwidth within CC 701 as TB/CBG 702. As both TB/CBG 752 and 754 may be transmitted on the single CC 701, both may be included in the single HARQ process associated with CC 701, thereby reducing signaling overhead. In the context of a wide bandwidth CC, the ability of a base station and UE to use multiple TB/CBGs enables selection of appropriate MCSs suitable for varying channel conditions to minimize loss across a wide bandwidth CC, and thereby reduce HARQ process overhead and associated retransmissions.

FIG. 7 depicts only one possible example embodiment. In practice, CC 701 can be configured with a varying number of TB/CBGs, depending on signal conditions across CC 701's bandwidth. Moreover, the base station may reduce or increase the number of TB/CBGs per TTI being utilized over time as signal conditions across CC 701 may change, based upon feedback (such as, e.g. a sounding reference signal) received from the UE. Furthermore, although FIG. 7 depicts TB/CBGs 752 and 754 as being substantially equal in size, the bandwidth of each TB/CBG may vary, e.g. TB/CBG 752 could be configured to occupy a smaller bandwidth than TB/CBG 754, and vice-versa.

Turning to FIG. 8, data scheduling for UEs with multiple RF chains is depicted. Two different configurations for TB/CBG scheduling per TTI across CCs are shown. In configuration 800, the UE's allocated data bandwidth is less than the bandwidth supported by one of the UE's RF chains. Consequently, the base station schedules a single CC 702 and single TB/CBG occupying less than the full CC 802 bandwidth. Configuration 850 depicts TB/CBG scheduling where the allocated data bandwidth exceeds the bandwidth supported by one of the UE's RF chains. In such an event, the base station schedules multiple TB/CBGs, one each for first CC 851 and second CC 853. Each TB/CBG is less than the bandwidth of its associated RF chain, with each RF chain corresponding to one of CC 851 and 853. The dividing point between first CC 851 and second CC 853 is the border between first TB/CBG 852 and second TB/CBG 854. Thus, first TB/CBG 852 is scheduled to first CC 851, and second TB/CBG 854 is scheduled to second CC 853.

As can be seen, the scheduling of configuration 850 is substantially similar to configuration 750, and likewise, each of first and second TB/CBGs 852 and 854 may have different MCSs, bandwidths, and sizes, with particular TB/CBG configurations determined by the base station with regard for the UE's capabilities and quality of each CC.

From the point of view of the base station, the process for scheduling TB/CBGs across multiple CCs may be the same as scheduling multiple TB/CBGs across a single wide bandwidth CC. Each CC may be scheduled according to FIG. 7, where each CC itself may have multiple TB/CBGs. In such an implementation, a UE supporting multiple CCs may have multiple TB/CBGs assigned to any given CC, resulting in a combination of FIGS. 7 and 8. For example, such a UE may have a first CC to which a single TB/CBG is scheduled, and a second CC to which multiple TB/CBGs are scheduled, according to the scheme disclosed in FIGS. 7 and 8.

Use of the schemes disclosed in FIGS. 7 and 8 can also enable a base station to schedule across multiple CCs without the need to engage in carrier aggregation. Instead, TB/CBGs are simply scheduled to individual CCs and use similar signaling as multiple TB/CBGs to a single CC. This may result in a reduction of the number of needed HARQ processes, as well as reducing medium access control processing complexity when compared with a CA process. Furthermore, the base station may determine the configuration of a given TB/CBG with consideration given to the CC and bandwidth capabilities of all UEs connected to the base station.

Where various UEs each support different CC bandwidths, some UEs with single RF chains may support bandwidths narrower than wideband carrier 306. The base station may first schedule UEs supporting the largest wideband CCs at the same time and balance the load among different frequency parts. Next, the base station may divide the wideband carrier 306 into multiple CCs with smaller bandwidths, to schedule to those UEs with different CCs that support a smaller bandwidth. For each CC, the base station may transmit some synchronization and broadcast signal/channel to convey the cell identity and system information. When this "always-on" signal is present in a CC, data resources for any UE traffic scheduled in the CC are rate matched around these "always-on" signals whenever resource allocation overlapping occurs.

A base station may utilize multiple CCs and TB/CBG scheduling to balance load across a wideband carrier 306's total bandwidth. For example, portions of carrier 306 may offer a higher signal quality over other portions. Such higher signal quality portions may likewise support higher throughput by enabling the use of more aggressive MCSs per TB/CBG. The base station may accordingly send configurations to connected UEs (depending upon each UE's signaled capabilities) that concentrate more CCs and TB/CBGs in higher quality spectrum portions, which are capable of supporting higher throughput. Likewise, fewer CCs and TB/CBGs may be scheduled in the lower quality bandwidth portions, thereby potentially optimizing the total throughput across all connected UEs within wideband carrier 306.

In FIG. 9, a base station supports a wideband CC, named CC 1, which is divided into three CCs, each with the same smaller BW, and defined as CCs 2, 3 and 4. To balance the load to be served in different frequency parts, the base station may associate UEs to the different CCs in an equally distributed manner. For example, as shown in FIG. 9, UE 902 utilized CC 1, UE 904 utilizes CC 3, and UE 906 utilizes both CC2 and CC 4.

Figure 10:
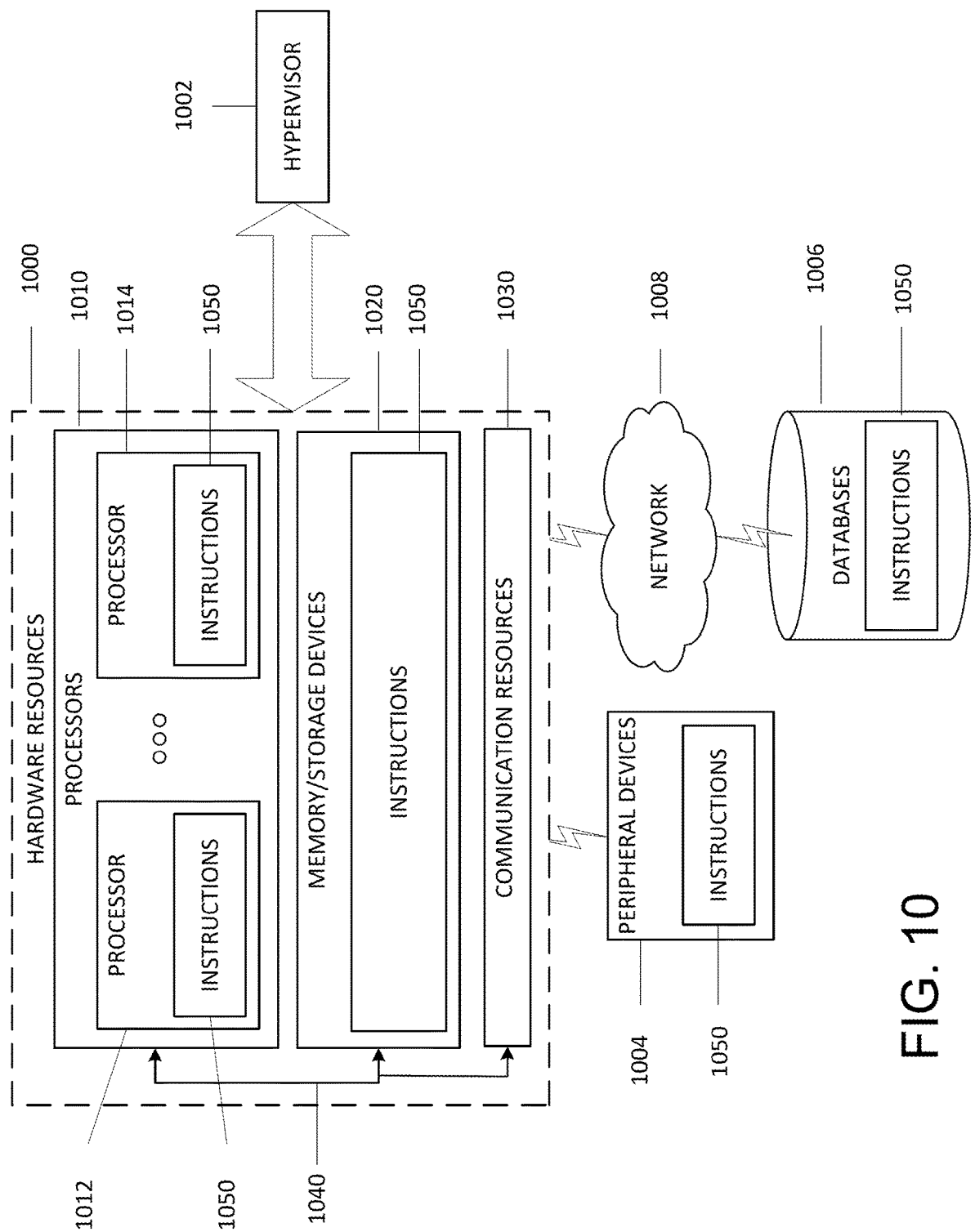
FIG. 10 illustrates hardware resources in accordance with some embodiments.

FIG. 10 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (for example, network function virtualization ("NFV")) is utilized, a hypervisor 1002 may be executed to provide an execution environment for one or more network slices/sub-slices to utilize the hardware resources 1000.

The processors 1010 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 1012 and a processor 1014. The processors may correspond to any processors of application circuitry 102 or baseband circuitry 104 of FIG. 1.

The memory/storage devices 1020 may include main memory, disk storage, or any suitable combination thereof. The memory/storage devices 1020 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 1020 may correspond to computer readable media.

The communication resources 1030 may include interconnection or network interface components or other suitable devices to communicate with one or more peripheral devices 1004 or one or more databases 1006 via a network 1008. For example, the communication resources 1030 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein.

The instructions 1050 may reside, completely or partially, within at least one of the processors 1010 (for example, within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

The resources described in FIG. 10 may also be referred to as circuitry. For example, communication resources 1030 may also be referred to as communication circuitry 1030.

Figure 11:
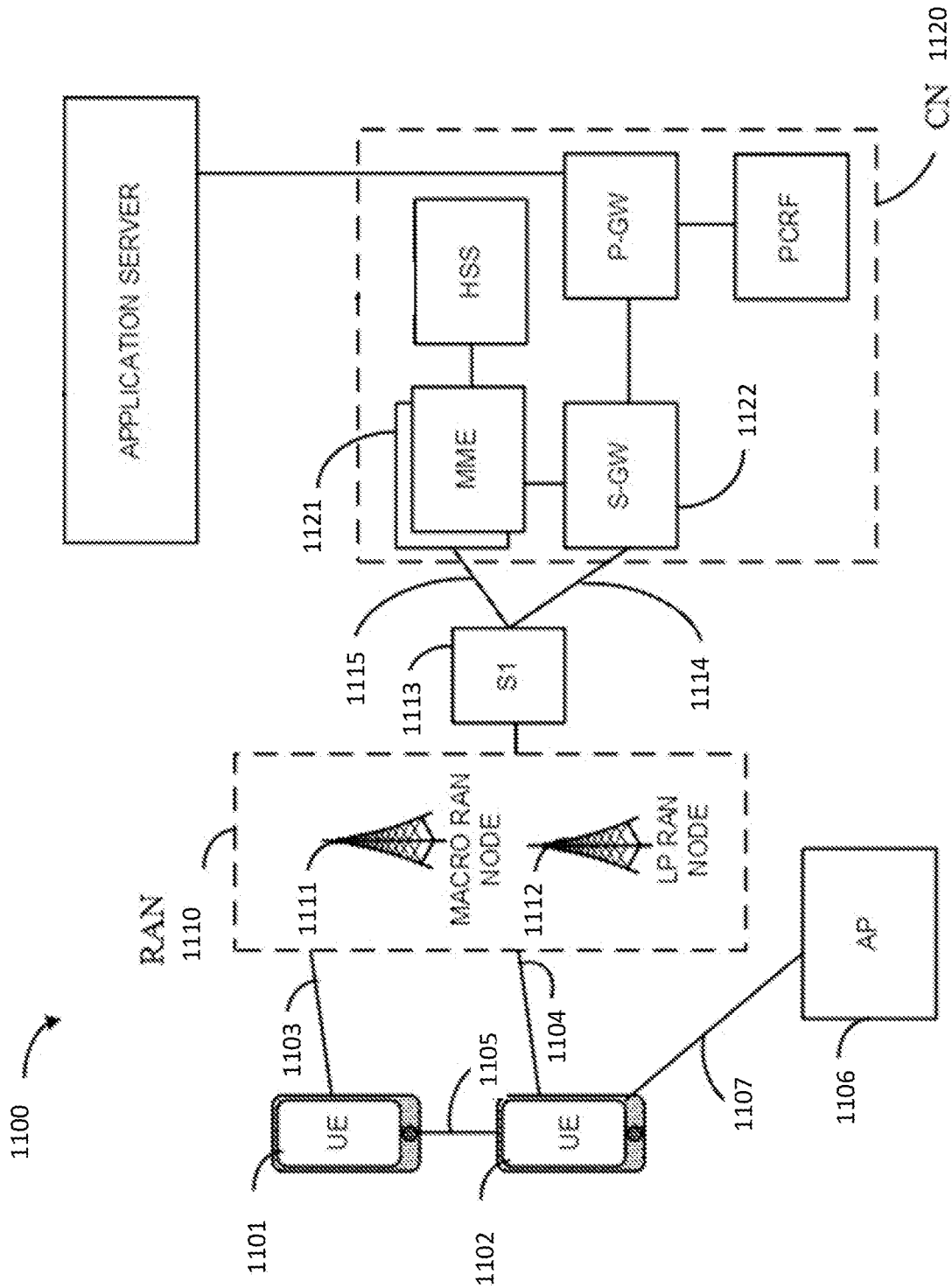
FIG. 11 depicts an architecture of a system of a network in accordance with some embodiments.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below). In this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

EXAMPLES

The following examples pertain to further embodiments. Example 1 comprises one or more computer-readable media having instructions that, when executed, cause a base station to generate first configuration information to configure a first user equipment ("UE") to operate using a first bandwidth within a wideband carrier of a cell; generate second configuration information to configure a second UE to operate a second bandwidth within the wideband carrier of the cell; and cause transmission of the first and second configuration information to the first and second UEs, respectively.

In Example 2, the subject matter of Example 1 can optionally include wherein the first bandwidth is a first downlink bandwidth and the first configuration information is to further configure the first UE with a first uplink bandwidth.

In Example 3, the subject matter of Example 1 or 2 can optionally include wherein the first configuration information comprises a downlink configuration and an uplink configuration.

In Example 4, the subject matter of Example 2 or 3 can optionally include wherein the first downlink bandwidth is different than the first uplink bandwidth.

In Example 5, the subject matter of any one of Examples 2-4 can optionally include wherein the first downlink bandwidth is centered on a first carrier frequency, and the first uplink bandwidth is centered on a second carrier frequency that is different than the first carrier frequency.

In Example 6, the subject matter of any one of Examples 2-5 can optionally include wherein the first downlink bandwidth, the first uplink bandwidth, or both, is equal to a maximum bandwidth of the wideband carrier of the cell.

In Example 7, the subject matter of any one of Examples 2-6 can optionally include wherein the first configuration information is to further configure the first UE with one or more frequency regions for downlink or uplink.

In Example 8, the subject matter of Example 7 can optionally include wherein the one or more frequency regions for downlink or uplink comprise one or more frequency regions for downlink and one or more frequency regions for uplink, wherein the one or more frequency regions for downlink are different than the one or more frequency regions for uplink.

In Example 9, the subject matter of any one of Examples 1-8 can optionally include wherein the instructions, when executed, further cause the base station to process a report from the UE to determine capabilities of the UE; and generate the first configuration information based on the capabilities.

Example 10 comprises a base station for communicating with user equipment (UE), comprising encoding circuitry to encode transmissions on a wideband carrier centered around a carrier frequency; and processing circuitry to configure a plurality of UEs for communication in a cell over simultaneous connections based upon capabilities of each UE of the plurality of UEs, wherein the encoding circuitry is further to encode a first transmission to a first UE from the plurality of UEs using a first bandwidth within the wideband carrier, and encode a second transmission to a second UE from the plurality of UEs using a second bandwidth within the wideband carrier.

In Example 11, the subject matter of Example 10 can optionally include wherein the processing circuitry is to selectively support carrier aggregation (CA) for each UE based upon the capabilities of each UE.

In Example 12, the subject matter of Example 10 or 11 can optionally include wherein the first bandwidth comprises a first downlink bandwidth and a first uplink bandwidth.

In Example 13, the subject matter of Example 12 can optionally include wherein the first downlink bandwidth is different than the first uplink bandwidth.

In Example 14, the subject matter of Example 12 or 13 can optionally include wherein the first downlink bandwidth, the first uplink bandwidth, or both is equal to a maximum bandwidth of the wideband carrier.

In Example 15, the subject matter of any of Examples 10-14 can optionally include wherein the processing circuitry is to configure a UE with an uplink channel that has a different carrier frequency region from a downlink channel.

In Example 16, the subject matter of any of Examples 10-15 can optionally include wherein the processing circuitry is to further generate first configuration information for the first UE; and generate second configuration information for the second UE; and the encoding circuitry is to encode transmissions of the first and second configuration to the first and second UEs, respectively.

Example 17 comprises a mobile communications apparatus, comprising means for configuring a plurality of user equipments (UEs) for communication within a wideband carrier having a bandwidth centered around a first channel frequency, wherein individual UEs of the plurality of UEs are configured with individual bandwidth and carrier aggregation configurations; and means for encoding a first transmission to a first UE of the plurality of UEs using a first bandwidth within the wideband carrier, and a second transmission to a second UE from the plurality of UEs using a second bandwidth within the wideband carrier.

In Example 18, the subject matter of Example 17 can optionally include wherein the first bandwidth is different from the second bandwidth.

In Example 19, the subject matter of Example 17 or 18 can optionally include wherein the first bandwidth is equal to the bandwidth of the wideband carrier.

In Example 20, the subject matter of Example 17 or 18 can optionally include wherein the first bandwidth is centered on a second channel frequency within the wideband carrier that is different from the first channel frequency.

In Example 21, the subject matter of any of Examples 17-20 can optionally include wherein the first bandwidth is comprised of an uplink bandwidth and a downlink bandwidth.

In Example 22, the subject matter of Example 21 can optionally include wherein the uplink bandwidth is different than the downlink bandwidth.

In Example 23, the subject matter of Example 21 or 22 can optionally include wherein the uplink bandwidth is centered on a different channel frequency from the downlink bandwidth.

Example 24 comprises one or more computer-readable media having instructions that, when executed, cause a base station to process from a first user equipment (UE) information about carrier capabilities of the first UE, the carrier capabilities of the first UE to include carrier aggregation (CA) capabilities or a bandwidth supported for downlink and uplink component carriers (CCs); process from a second UE information about the second UE's carrier capabilities, including bandwidths for downlink and uplink CCs and CA capabilities; and determine and transmit to each of the first UE and second UE a configuration for downlink CC bandwidth, downlink CC frequency, uplink CC bandwidth, uplink CC frequency, and carrier aggregation, wherein the configuration of the first UE is different from the configuration of the second UE.

In Example 25, the subject matter of Example 24 can optionally include wherein the configuration of the first UE includes a downlink CC bandwidth equal to a bandwidth of a wideband carrier of the base station.

In Example 26, the subject matter of Example 25 can optionally include wherein the configuration of the first UE includes a downlink CC bandwidth that is different from an uplink CC bandwidth of the first UE.

In Example 27, the subject matter of any of Examples 24-26 can optionally include wherein the configuration of the second UE includes a downlink CC bandwidth that is less than the bandwidth of the wideband carrier of the base station.

In Example 28, the subject matter of any of Examples 24-27 can optionally include wherein the wideband carrier of the base station is centered around a first carrier frequency, and the configuration of the first UE includes a downlink CC frequency that is different from the first carrier frequency.

In Example 29, the subject matter of Example 28 can optionally include wherein the configuration of the first UE includes an uplink CC frequency that is different from the first carrier frequency.

In Example 30, the subject matter Example 28 or 29 can optionally include wherein the downlink CC frequency of the first UE is different from the uplink CC frequency of the first UE.

In Example 31, the subject matter of any of Examples 24-30 can optionally include wherein the configuration of the first UE includes a carrier aggregation configuration that is different from a carrier aggregation configuration of the configuration of the second UE.

Example 32 comprises a user equipment (UE) for communicating with a base station, comprising encoding circuitry capable of communicating with a base station, using a component carrier (CC) having a bandwidth and carrier frequency; and processing circuitry for configuring the UE in response to receiving configuration instructions from the base station system, the configuration instructions including a first designated CC bandwidth and a first designated CC carrier frequency, the first designated CC bandwidth being within a wideband carrier of the base station, wherein the processing circuitry is to: perform a search and initial synchronization with the base station; transmit capability information to the base station using the encoding circuitry, the capability information to include a CC bandwidth supported by the UE; and configure the UE in accordance with the configuration instructions.

In Example 33, the subject matter of Example 32 can optionally include wherein the capability information includes carrier aggregation (CA) support information, and the configuration instructions include a CA configuration.

In Example 34, the subject matter of Example 32 or 33 can optionally include wherein the first designated CC bandwidth is equal to a bandwidth of the wideband carrier of the base station.

In Example 35, the subject matter of any of Examples 32-34 can optionally include wherein the first designated CC bandwidth is a downlink bandwidth, the configuration instructions further comprise a second designated CC bandwidth, and the second designated CC bandwidth is an uplink bandwidth.

In Example 36, the subject matter of any of examples 32-35 can optionally include wherein the downlink bandwidth is different from the uplink bandwidth.

In Example 37, the subject matter of any of examples 32-36 can optionally include wherein the first designated CC carrier frequency is different from the carrier frequency of the wideband carrier of the base station.

In Example 38, the subject matter of any of examples 32-37 can optionally include wherein the first designated CC carrier frequency is a downlink frequency, and the configuration instructions further comprise an uplink frequency.

In Example 39, the subject matter of any of examples 32-38 can optionally include wherein the downlink frequency is in a different frequency region from the uplink frequency.

Example 40 comprises one or more computer-readable media having instructions that, when executed, cause a user equipment (UE) to transmit to a base station information about the UE's capabilities, the capability information including a component carrier (CC) bandwidth, the CC bandwidth being within or equal to a wideband carrier supported by the base station; process configuration instructions from the base station, the configuration instructions including a first designated CC bandwidth and a first designated CC carrier frequency; and configure baseband circuitry to use the first designated CC bandwidth and first designated CC carrier frequency.

In Example 41, the subject matter of Example 40 can optionally include wherein the capability information further includes carrier aggregation (CA) capabilities, and the configuration instructions further include a CA configuration.

In Example 42, the subject matter of Example 40 or 41 can optionally include wherein the first designated CC bandwidth is a downlink bandwidth, the configuration instructions further comprise a second designated CC bandwidth, and the second designated CC bandwidth is an uplink bandwidth.

In Example 43, the subject matter of any of Examples 40-42 can optionally include wherein the downlink bandwidth is different from the uplink bandwidth.

In Example 44, the subject matter of any of Examples 40-43 can optionally include wherein the first designated CC carrier frequency is a downlink frequency, the configuration instructions further comprise a second designated CC carrier frequency, and the second designated CC carrier frequency is an uplink frequency.

In Example 45, the subject matter of any of examples 40-44 can optionally include wherein the downlink frequency is in a different frequency region from the uplink frequency.

Example 46 comprises a method for wide bandwidth operation by a user equipment (UE), comprising transmitting capability information to a base station, the capability information including a component carrier (CC) bandwidth supported by the UE, the CC bandwidth being within or equal to a wideband carrier supported by the base station; processing UE-specific configuration instructions from the base station, the configuration instructions including a first designated CC bandwidth and a first designated CC carrier frequency; and configuring baseband circuitry to use the first designated CC bandwidth and first designated CC carrier frequency.

In Example 47, the subject matter of example 46 can optionally include wherein the capability information further includes carrier aggregation (CA) capabilities, and the configuration instructions further include a CA configuration.

In Example 48, the subject matter of example 46 or 47 can optionally include wherein the first designated CC bandwidth is a downlink bandwidth, the configuration instructions further comprise a second designated CC bandwidth, and the second designated CC bandwidth is an uplink bandwidth.

In Example 49, the subject matter of any of examples 46-48 can optionally include wherein the downlink bandwidth is different from the uplink bandwidth.

In Example 50, the subject matter of any of examples 46-49 can optionally include wherein the first designated CC carrier frequency is a downlink frequency, the configuration instructions further comprise a second designated CC carrier frequency, and the second designated CC carrier frequency is an uplink frequency.

In Example 51, the subject matter of any of examples 46-50 can optionally include wherein the downlink frequency is in a different frequency region from the uplink frequency.

Example 52 comprises a method for wide bandwidth operation by a base station, comprising processing information, from a first user equipment (UE), the first UE's component carrier (CC) bandwidth and carrier aggregation (CA) capabilities; processing information, from a second UE, the second UE's CC bandwidth and CA capabilities, the second UE's bandwidth and CA capabilities being different than the first UE's bandwidth and CA capabilities; and transmitting, by the base station, a first CC bandwidth and CA configuration to the first UE and a second CC bandwidth and CA configuration to the second UE, wherein the first CC bandwidth and CA configuration is different from the second CC bandwidth and CA configuration, and both CC bandwidth and CA configurations are contained within a carrier bandwidth of the base station.

In Example 53, the subject matter of Example 52 can optionally include wherein the first UE supports an uplink CC with a different bandwidth from a downlink CC.

In Example 53, the subject matter of Example 52 or 53 can optionally include wherein the first UE supports an uplink CC with a different frequency from a downlink CC.

In Example 55, the subject matter of any of Examples 52-54 can optionally include wherein the first CC bandwidth and CA configuration includes a single CC bandwidth equal to the carrier bandwidth of the base station.

In Example 56, the subject matter of any of Examples 52-55 can optionally include wherein the second CC bandwidth and CA configuration includes at least one CC bandwidth that is less than the carrier bandwidth of the base station.

Example 57 comprises a base station, comprising processing circuitry; and encoding circuitry in communication with the processing circuitry to simultaneously communicate with a plurality of user equipments (UEs) within a wideband carrier, where each of the plurality of UEs has at least one component carrier (CC), wherein the processing circuitry is to receive from each UE of the plurality of UEs a number and size of transport blocks (TBs) or code block groups (CBGs) the UE is capable of exchanging, and assign each CC a TB/CBG, with each TB/CBG having an associated modulation coding scheme (MCS) that may vary from other TBs/CBGs, and multiple TBs/CBGs may be scheduled in a single hybrid automatic repeat request (HARQ) process.

In Example 58, the subject matter of Example 57 can optionally include wherein the processing circuitry is to assign multiple TBs/CBGs to a CC.

In Example 59, the subject matter of Example 57 or 58 can optionally include wherein the size of each TB/CBG is equal to or less than a size of a CC.

In Example 60, the subject matter of any of Examples 57-59 can optionally include wherein the MCS associated with a TB/CBG is selected based at least in part upon a signal condition of the CC to which the TB/CBG is assigned.

In Example 61, the subject matter of any of Examples 57-60 can optionally include wherein the processing circuitry is to communicate with a first UE that has a single first CC with a first CC bandwidth, and is to communicate with a second UE that has a plurality of second CCs, each of the plurality of CCs with a second CC bandwidth, the second CC bandwidth being different from the first CC bandwidth.

In Example 62, the subject matter of Example 61 can optionally include wherein the size of each TB.CBG is the size of the smaller of the first CC bandwidth and second CC bandwidth.

Example 63 comprises a user equipment (UE), further comprising encoding circuitry to communicate with a base station over a wideband component carrier (CC) with a CC bandwidth; and processing circuitry in communication with the encoding circuitry to receive from the base station a transport block (TB) or code block group (CBG) configuration, the TB/CBG configuration including the number of TBs/CBGs assigned to the CC and a modulation coding scheme (MCS) assigned to each TB/CBG, wherein the CC may be subdivided into a plurality of TBs/CBGs, with each TB/CBG having a different MCS, and multiple TBs/CBGs may be scheduled in a single hybrid automatic repeat request (HARQ) process.

In Example 64, the subject matter of Example 63 can optionally include wherein the TB/CBG configuration further comprises resource allocation information of other UEs in communication with the base station, and the processing circuitry is to use the resource allocation information to configure the encoding circuitry to prevent interference with other UEs in communication with the base station.

In Example 65, the subject matter of Example 63 or 64 can optionally include wherein the size of each TB/CBG is equal to or less than a size of the CC bandwidth.

In Example 66, the subject matter of any of Examples 63-65 can optionally include wherein the size of each TB/CBG is less than the size of the CC bandwidth, and multiple TBs/CBGs are assigned to the CC, with each of the multiple TBs/CBGs being assigned to a different part of the CC bandwidth.

In Example 67, the subject matter of any of Examples 63-66 can optionally include wherein the MCS associated with a TB/CBG is selected at least in part upon a signal condition of the part of the CC bandwidth to which the TB/CBG is assigned.

Example 68 comprises one or more computer-readable media having instructions that, when executed, cause a base station to process capability information corresponding to a plurality of user equipments (UEs), the capability information to include, for individual UEs of the plurality of UEs, a number of component carriers (CCs), a bandwidth supported for each CC, a number of supported transport blocks (TBs) or code block groups (CBG), and a supported TB/CBG size, where the bandwidth supported for each CC and the supported TB/CBG size are equal to or less than a bandwidth of a wideband carrier supported by the base station; generate TB/CBG configuration information that is to be transmitted to individual UEs of the plurality of UEs; and process one or more TBs/CBGs received from at least two UEs of the plurality of UEs in a single hybrid automatic repeat request (HARQ) process, wherein individual TBs/CBGs of the one or more TBs/CBGs have respective modulation coding schemes (MCSs).

In Example 69, the subject matter of Example 68 can optionally include wherein the instructions further cause the base station to assign multiple TBs/CBGs to a CC of one of the UEs.

In Example 70, the subject matter of Example 68 or 69 can optionally include wherein the size of each TB/CBG is equal to or less than a bandwidth of the CC.

In Example 71, the subject matter of any of Examples 68-70 can optionally include wherein instructions further cause the base station to choose the MCS associated with a TB/CBG based upon a signal quality of an associated portion of the bandwidth of the CC bandwidth.

In Example 72, the subject matter of any of Examples 68-71 can optionally include wherein instructions when executed further cause the base station to communicate with a first UE that has a single first CC with a first CC bandwidth, and a second UE that has a plurality of second CCs, each of the plurality of CCs with a second CC bandwidth, the second CC bandwidth being different from the first CC bandwidth.

In Example 73, the subject matter of Example 72 can optionally include wherein the size of each TB/CBG is the size of the smaller of the first CC bandwidth and second CC bandwidth.

Example 74 comprises one or more computer-readable media having instructions that, when executed, cause a user equipment to transmit to a base station information about the UE's capabilities, including the UE's number of supported component carriers (CCs), bandwidth supported for each CC, number of supported transport blocks (TBs) or code block groups (CBGs) and supported TB/CBG size, wherein the bandwidth of each CC is equal to or less than a wideband carrier supported by the base station; process from the base station a TB/CBG configuration specific to the UE, the TB/CBG configuration including the number of TBs/CBGs assigned to each CC and a modulation coding scheme (MCS) assigned to each TB/CBG; and exchange one or more TBs/CBGs with the base station according to the TB/CBGs configuration.

In Example 75, the subject matter of Example 74 can optionally include wherein the one or more TBs/CBGs can be exchanged in a single hybrid automatic repeat request (HARQ) 7 process.

In Example 76, the subject matter of Example 74 or 75 can optionally include wherein the TB/CBG configuration further comprises resource allocation information of other UEs in communication with the base station, and the instructions further cause the baseband processor to use the resource allocation information to prevent interference with other UEs in communication with the base station.

In Example 77, the subject matter of any of Examples 74-76 can optionally include wherein the size of each TB/CBG is equal to or less than a size of the bandwidth of each CC.

In Example 78, the subject matter of any of Examples 74-77 can optionally include wherein the size of each TB/CBG is less than the size of the bandwidth of each CC, and multiple TBs/CBGs are assigned to each CC, with each of the multiple TBs/CBGs being assigned to a different part of each CC's bandwidth.

In Example 79, the subject matter of any of Examples 74-78 can optionally include wherein the MCS associated with a TB/CBG is selected based at least in part upon a signal condition of the part of the CC bandwidth to which the TB/CBG is assigned.

Example 80 comprises an apparatus for exchanging communications with a user equipment (UE), further comprising processing means; and encoding means in communication with the processing means that can simultaneously communicate with a plurality of user equipments (UEs) within a wideband carrier, where each of the plurality of UEs has at least one component carrier (CC), wherein the processing means is to receive from each UE of the plurality of UEs a number and size of transport blocks (TBs) or code block groups (CBGs) the UE is capable of exchanging, and assign each CC a TB/CBG, with each TB/CBG having an associated modulation coding scheme (MCS) that may vary from other TBs/CBGs, and multiple TBs/CBGs may be scheduled in a single hybrid automatic repeat request (HARQ) process.

In Example 81, the subject matter of Example 80 can optionally include wherein the processing means can assign multiple TBs/CBGs to a CC.

In Example 82, the subject matter of Example 80 or 81 can optionally include wherein the size of each TB/CBG is equal to or less than a size of a CC.

In Example 83, the subject matter of any of Examples 80-82 can optionally include wherein the MCS associated with a TB/CBG is selected based at least in part upon a signal condition of the CC to which the TB/CBG is assigned.

In Example 84, the subject matter of any of Examples 80-83 can optionally include wherein the processing means is to communicate with a first UE that has a single first CC with a first CC bandwidth, and is to communicate with a second UE that has a plurality of second CCs, each of the plurality of CCs with a second CC bandwidth, the second CC bandwidth being different from the first CC bandwidth.

In Example 85, the subject matter of Example 84 can optionally include wherein the size of each TB/CBG is the size of the smaller of the first CC bandwidth and second CC bandwidth.

Example 86 comprises an apparatus for exchanging communications with a base station, further comprising encoding means to communicate with a base station over a wideband component carrier (CC) with a CC bandwidth; and processing means in communication with the encoding means to receive from the base station a transport block (TB) or code block group (CBG) configuration, the TB/CBG configuration including the number of TBs/CBGs assigned to the CC and a modulation coding scheme (MCS) assigned to each TB/CBG, wherein the CC may be subdivided into a plurality of TBs/CBGs, with each TB/CBG having a different MCS, and multiple TBs/CBGs may be scheduled in a single hybrid automatic repeat request (HARQ) process.

In Example 87, the subject matter of Example 86 can optionally include wherein the TB/CBG configuration further comprises resource allocation information of other UEs in communication with the base station, and the processing means is to use the resource allocation information to configure the encoding means to prevent interference with other UEs in communication with the base station.

In Example 88, the subject matter of Example 86 or 87 can optionally include wherein the size of each TB/CBG is equal to or less than a size of the CC bandwidth.

In Example 89, the subject matter of any of Examples 86-88 can optionally include wherein the size of each TB/CBG is less than the size of the CC bandwidth, and multiple TBs/CBGs are assigned to the CC, with each of the multiple TBs/CBGs being assigned to a different part of the CC bandwidth.

In Example 90, the subject matter of any of Examples 86-89 can optionally include wherein the MCS associated with a TB/CBG is selected based at least in part upon a signal condition of the part of the CC bandwidth to which the TB/CBG is assigned.

What is claimed is:

1. One or more non-transitory computer-readable media having instructions that, when executed, cause a base station to:
generate first configuration information to configure a first user equipment ("UE") to operate using a first number of component carriers including a first component carrier within a wideband carrier of a cell, wherein the first component carrier has a first center frequency;
generate second configuration information to configure a second UE to operate using a second number of component carriers including a second component carrier within the wideband carrier of the cell, wherein the second number of component carriers is different than the first number of component carriers and the second component carrier has a second center frequency that is different than the first center frequency; and
cause transmission of the first and second configuration information to the first and second UEs, respectively.

2. The one or more non-transitory computer-readable media of claim 1, wherein the instructions cause the base station to configure the first UE to operate using a first bandwidth, and wherein first bandwidth is a first downlink bandwidth and the first configuration information is to further configure the first UE with a first uplink bandwidth.

3. The one or more non-transitory computer-readable media of claim 1, wherein the first configuration information comprises a downlink configuration and an uplink configuration.

4. The one or more non-transitory computer-readable media of claim 2, wherein the first downlink bandwidth is different than the first uplink bandwidth.

5. The one or more non-transitory computer-readable media of claim 2, wherein the first downlink bandwidth, the first uplink bandwidth, or both, is equal to a maximum bandwidth of the wideband carrier of the cell.

6. The one or more non-transitory computer-readable media of claim 2, wherein the first configuration information is to further configure the first UE with one or more frequency regions for downlink or uplink.

7. The one or more non-transitory computer-readable media of claim 6, wherein the one or more frequency regions for downlink or uplink comprise one or more frequency regions for downlink and one or more frequency regions for uplink, wherein the one or more frequency regions for downlink are different than the one or more frequency regions for uplink.

8. The one or more non-transitory computer-readable media of claim 1, wherein the instructions, when executed, further cause the base station to:
process a report from the UE to determine capabilities of the UE; and
generate the first configuration information based on the capabilities.

9. A base station for communicating with user equipment (UE), comprising:
encoding circuitry to encode transmissions on a wideband carrier centered around a carrier frequency; and
processing circuitry to configure a plurality of UEs for communication in a cell over simultaneous connections based upon capabilities of each UE of the plurality of UEs,
wherein the encoding circuitry is further to:
encode a first transmission to a first UE from the plurality of UEs using a first number of component carriers including a first component carrier within the wideband carrier, wherein the first component carrier has a first center frequency, and
encode a second transmission to a second UE from the plurality of UEs using a second number of component carriers including a second component carrier within the wideband carrier, wherein the second number of component carriers is different than the first number of component carriers and the second component carrier has a second center frequency that is different than the first center frequency.

10. The base station of claim 9, wherein the processing circuitry is to selectively configure carrier aggregation (CA) for each UE based upon the capabilities of each UE.

11. The base station of claim 9, wherein the processing circuitry configures the first UE to operate using a first bandwidth, and wherein the first bandwidth comprises a first downlink bandwidth and a first uplink bandwidth.

12. The base station of claim 11, wherein the first downlink bandwidth, the first uplink bandwidth, or both is equal to a bandwidth of the wideband carrier.

13. The base station of claim 9, wherein the processing circuitry is to configure a UE with an uplink channel that has a different carrier frequency region from a downlink channel.

14. The base station of claim 9, wherein the processing circuity is to further:
generate first configuration information for the first UE; and
generate second configuration information for the second UE;
and the encoding circuitry is to encode transmissions of the first and second configuration to the first and second UEs, respectively.

15. A user equipment (UE) for communicating with a base station, comprising:
decoding circuitry to decode transmissions from a base station;
encoding circuitry to encode transmissions to the base station; and
processing circuitry, coupled with the decoding circuitry, to:
configure components of the UE based on configuration instructions received within the decoded transmissions, the configuration instructions to include a first designated component carrier (CC) downlink bandwidth, a first uplink bandwidth and a first designated CC carrier frequency, at least one of the first designated CC downlink bandwidth or the first uplink bandwidth being within equal to a maximum bandwidth of a wideband carrier of the base station, and wherein the first designated CC carrier frequency is different than a second designated CC carrier frequency that is assigned by the base station to a second UE; and
perform a search and initial synchronization based on the decoded transmission; and
cause the encoding circuitry to transmit, in an encoded transmission, capability information that is to include a CC bandwidth supported by the UE.

16. The user equipment of claim 15, wherein the capability information is to include carrier aggregation (CA) support information, and the configuration instructions are to include a CA configuration.

17. The user equipment of claim 15, wherein the first designated CC carrier frequency is different from the carrier frequency of the wideband carrier of the base station.

18. The user equipment of claim 17, wherein the first designated CC carrier frequency is a downlink frequency, and the configuration instructions further comprise an uplink frequency.

19. One or more non-transitory computer-readable media having instructions that, when executed, cause a base station to:
  process capability information corresponding to a plurality of user equipments (UEs), the capability information to include, for individual UEs of the plurality of UEs, a number of supported component carriers (CCs), a bandwidth supported for each CC, a number of supported transport blocks (TBs) or code block groups (CBG), and a supported TB/CBG size, where the bandwidth supported for each CC and the supported TB/CBG size are equal to or less than a bandwidth of a wideband carrier supported by the base station;
  generate TB/CBG configuration information that is to be transmitted to individual UEs of the plurality of UEs; and
  process one or more TBs/CBGs received from at least two UEs of the plurality of UEs in a single hybrid automatic repeat request (HARQ) process,
  wherein individual TBs/CBGs of the one or more TBs/CBGs have respective modulation coding schemes (MCSs).

20. The one or more non-transitory computer-readable media of claim 19, wherein the instructions further cause the base station to assign multiple TBs/CBGs to a CC of one UE of the plurality of UEs.

21. The one or more non-transitory computer-readable media of claim 19, wherein the size of each TB/CBG is equal to or less than a bandwidth of the CC.

22. The one or more non-transitory computer-readable media of claim 19, wherein instructions further cause the base station to choose the MCS associated with a TB/CBG based upon a signal quality of an associated portion of the bandwidth of the CC bandwidth.

23. The one or more non-transitory computer-readable media of claim 19, wherein instructions when executed further cause the base station to communicate with a first UE that has a single first CC with a first CC bandwidth, and a second UE that has a plurality of second CCs, each of the plurality of CCs with a second CC bandwidth, the second CC bandwidth being different from the first CC bandwidth.

24. The one or more non-transitory computer-readable media of claim 23, wherein the size of each TB/CBG is the size of the smaller of the first CC bandwidth and second CC bandwidth.

25. The one or more non-transitory computer-readable media of claim 1, wherein the first component carrier is assigned a first frequency range and the second component carrier is assigned a second frequency range that is different than the first frequency range, and
  wherein the first frequency range encompasses the second frequency range.

* * * * *

UNITED STATES PATENT AND TRADEMARK OFFICE
CERTIFICATE OF CORRECTION

| | | |
|---|---|---|
| PATENT NO. | : 11,477,075 B2 | Page 1 of 1 |
| APPLICATION NO. | : 16/339693 | |
| DATED | : October 18, 2022 | |
| INVENTOR(S) | : Joonyoung Cho et al. | |

It is certified that error appears in the above-identified patent and that said Letters Patent is hereby corrected as shown below:

On the Title Page

Item (54), Line 1, Delete "CONFIRGURATION" and insert -- CONFIGURATION --;

In the Specification

Column 1, Line 1, Delete "CONFIRGURATION" and insert -- CONFIGURATION --; and

In the Claims

Column 34, Line 58, In Claim 15, after "being" delete "within".

Signed and Sealed this
Third Day of January, 2023

Katherine Kelly Vidal
*Director of the United States Patent and Trademark Office*